US008643882B2

(12) United States Patent
Takahashi

(10) Patent No.: US 8,643,882 B2
(45) Date of Patent: Feb. 4, 2014

(54) PRINT PREVIEW DISPLAY OF CONFIRMATION PAGE WITH MAIN PAGE BASED ON SELECTED DISPLAY METHOD

(75) Inventor: Hiroyuki Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 282 days.

(21) Appl. No.: 13/054,469

(22) PCT Filed: Sep. 4, 2009

(86) PCT No.: PCT/JP2009/065880
§ 371 (c)(1),
(2), (4) Date: Jan. 14, 2011

(87) PCT Pub. No.: WO2010/029984
PCT Pub. Date: Mar. 18, 2010

(65) Prior Publication Data
US 2011/0122446 A1 May 26, 2011

(30) Foreign Application Priority Data

Sep. 9, 2008 (JP) ................................. 2008-231195

(51) Int. Cl.
*G06F 3/12* (2006.01)
(52) U.S. Cl.
USPC ........................... 358/1.15; 358/1.13; 715/274
(58) Field of Classification Search
USPC .......................................................... 358/1.15
See application file for complete search history.

(56) References Cited

U.S. PATENT DOCUMENTS

| 6,727,999 | B1 | 4/2004 | Takahashi | |
|---|---|---|---|---|
| 6,912,059 | B1 | 6/2005 | Takahashi | |
| 7,119,920 | B2 * | 10/2006 | Takahashi | 358/1.15 |
| 7,162,518 | B2 | 1/2007 | Takahashi | |
| 7,612,919 | B2 | 11/2009 | Takahashi | |
| 7,616,906 | B2 | 11/2009 | Yamamoto | |
| 7,698,471 | B2 * | 4/2010 | Aoki et al. | 710/15 |
| 7,724,386 | B2 | 5/2010 | Takahashi | |

(Continued)

FOREIGN PATENT DOCUMENTS

| CN | 1497425 | 5/2004 |
|---|---|---|
| EP | 1686457 A2 | 8/2006 |

(Continued)

OTHER PUBLICATIONS

European Search Report dated Aug. 5, 2011 in corresponding EP Application No. 09813130.3.

(Continued)

*Primary Examiner* — Benjamin O Dulaney
(74) *Attorney, Agent, or Firm* — Fitzpatrick, Cella, Harper & Scinto

(57) ABSTRACT

A client PC 12 is capable of creating a job which can be processed by an image forming apparatus 10 where the image forming apparatus 10 prints and outputs a page for main printing included in the job received from the client PC 12 according to the job. The client PC 12 includes a CPU 201 that receives an instruction for setting confirmation printing in the image forming apparatus 10 so that a confirmation page is printed in addition to the page for main printing and output to a destination different from that of the page for main printing, and carries out the received instruction on each of the jobs; and an NC 212 that sends the job with settings for the confirmation printing provided to the image forming apparatus 10.

11 Claims, 22 Drawing Sheets

(56) References Cited

U.S. PATENT DOCUMENTS

| | | |
|---|---|---|
| 7,952,731 B2 | 5/2011 | Utsunomiya |
| 2005/0168764 A1* | 8/2005 | Yamamura .................... 358/1.13 |
| 2005/0262274 A1* | 11/2005 | Aoki et al. ...................... 710/15 |
| 2006/0129924 A1* | 6/2006 | Nelson et al. .................. 715/530 |
| 2006/0238811 A1* | 10/2006 | Soma et al. ................... 358/1.16 |
| 2007/0242962 A1* | 10/2007 | Yamamoto ...................... 399/15 |
| 2007/0291286 A1 | 12/2007 | Utsunomiya et al. |
| 2007/0296981 A1* | 12/2007 | Lee et al. ....................... 358/1.1 |

FOREIGN PATENT DOCUMENTS

| | | |
|---|---|---|
| JP | 08-106191 A | 4/1996 |
| JP | 2005-153374 | 6/2005 |
| JP | 2005-153374 A | 6/2005 |
| JP | 2007-26054 A | 2/2007 |
| JP | 2007-072299 A | 3/2007 |
| JP | 2007-283603 | 11/2007 |
| JP | 2007-283603 A | 11/2007 |
| JP | 2008-54285 | 3/2008 |
| JP | 2008-054285 A | 3/2008 |

OTHER PUBLICATIONS

PCT International Search Report and Written Opinion of the International Searching Authority, mailed Dec. 8, 2009, in PCT/JP2009/065880.

Chinese Office Action dated Feb. 21, 2013 issued during prosecution of related Chinese application No. 200980135375.6.

* cited by examiner

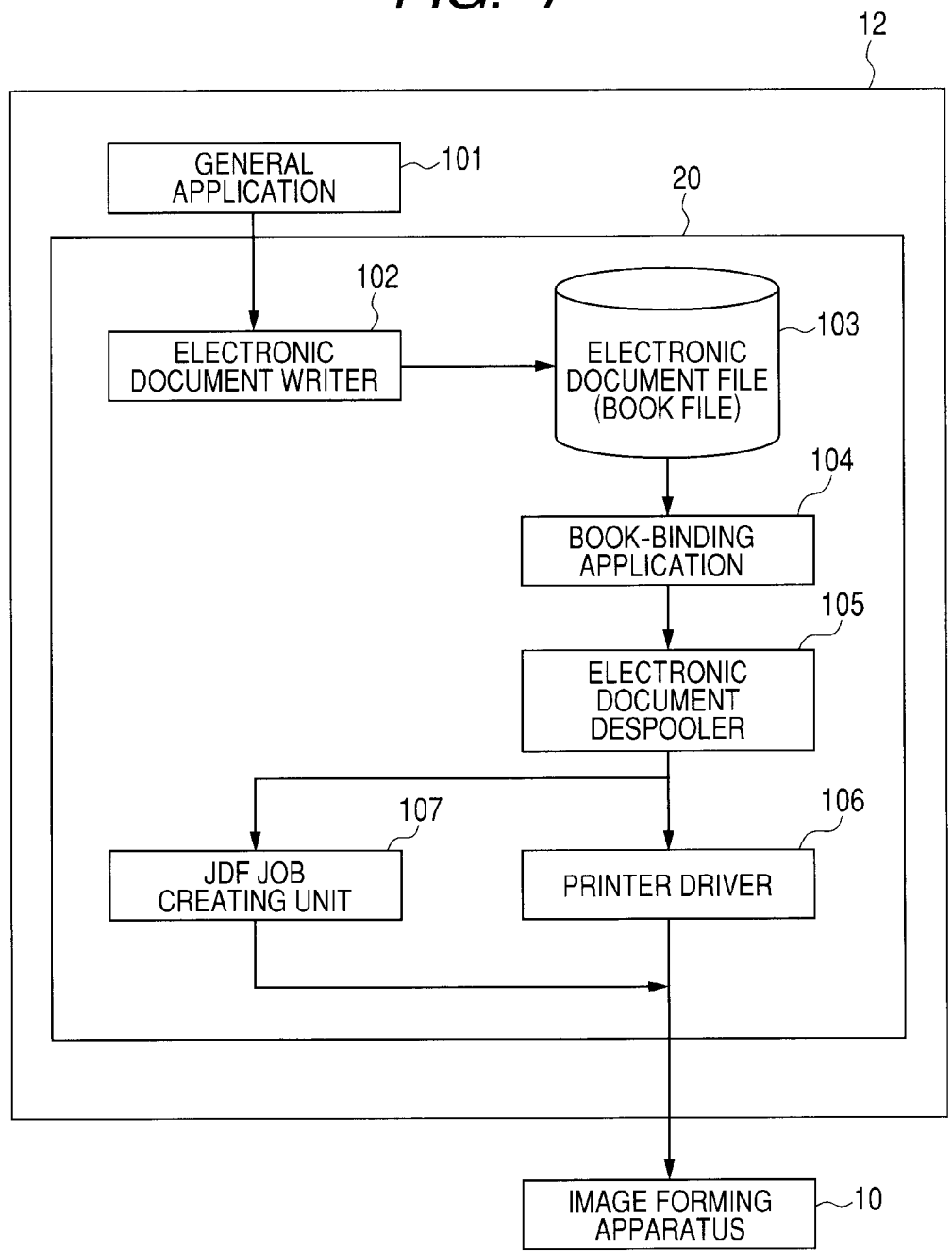

FIG. 13

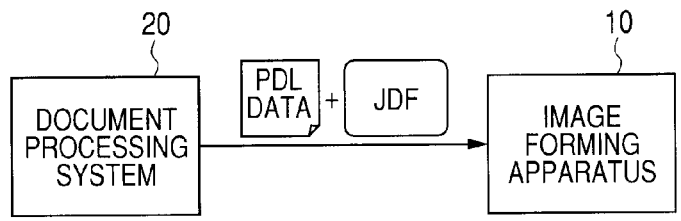

FIG. 14

```
<JDF ID="J1" JobPartID="ID0" Type="Combined"
Types="LayoutPreparation Imposition Interpreting ColorSpaceConversion Rendering
DigitalPrinting"
Activation="Active" Status="Ready" Version="1.2" Category="DigitalPrinting"
ICSVersions="IDP_L1-1.0 Base_L1-1.0"MaxVersion="1.2"
xmlns="http://www.CIP4.org/JDFSchema_1_1"
JobID="20080414-121932" DescriptiveName="sample">

<ResourcePool>
  .....
    <DigitalPrintingParams Class="Parameter" ID="IDDPP" Status="Available"    ⎫  DESCRIPTION
      Collate="SheetSetAndJob" PartIDKeys="RunIndex">                          ⎬  INDICATING
        <DigitalPrintingParams RunIndex="0~4"OutputBin="Stacker-A"/>           ⎬  SWITCH OF
        <DigitalPrintingParams RunIndex="5~5"OutputBin="SampleTray-A"/>        ⎬  PAPER OUTPUT
        <DigitalPrintingParams RunIndex="6~14"OutputBin="Stacker-A"/>          ⎭  DESTINATION
    <DigitalPrintingParamas>
  .....
  </ResourcePool>

<ResourceLinkPool>
  .....
  </ResourceLinkPool>
</JDF>
```

FIG. 16

```
<JDF ID="J2" JobPartID="ID1" Type="Combined"
Types="LayoutPreparation Imposition Interpreting ColorSpaceConversion Rendering
DigitalPrinting Stitching"
Activation="Active" Status="Ready" Version="1.2" Category="DigitalPrinting"
ICSVersions="IDP_L1-1.0 Base_L1-1.0" MaxVersion="1.2"
xmlns="http://www.CIP4.org/JDFSchema_1_1"
JobID="20080414-121932" DescriptiveName="sample">

<ResourcePool>
  .....
  <DigitalPrintingParams Class="Parameter" ID="IDDPP" Status="Available"
    Collate="SheetSetAndJob"PartIDKeys="RunIndex">
      <DigitalPrintingParams RunIndex="0~4"OutputBin="FinisherTray-B"/>
      <DigitalPrintingParams RunIndex="5~5"OutputBin="FinisherTray-A"/>
      <DigitalPrintingParams RunIndex="6~14"OutputBin="FinisherTray-B"/>
  </DigitalPrintingParamas>
```
} DESCRIPTION INDICATING SWITCH OF PAPER OUTPUT DESTINATION

```
  <StitchingParams ID="RES_005" Class="Parameter" Status="Available"
NoOp="true" PartIDKeys="RunIndex">
    <StitchingParams NoOp="false" RunIndex="0~4" StitchType="Corner"/>
    <StitchingParams NoOp="false" RunIndex="6~14" StitchType="Corner"/>
  </StitchingParams>
```
} DESCRIPTION INDICATING STAPLING PROCESSING

```
  .....
</ResourcePool>

<ResourceLinkPool>
  .....
</ResourceLinkPool>
</JDF>
```

PRINT PREVIEW DISPLAY OF CONFIRMATION PAGE WITH MAIN PAGE BASED ON SELECTED DISPLAY METHOD

TECHNICAL FIELD

The present invention relates to an information processing apparatus, an image forming system, a control method for the information processing apparatus or the image forming system, a computer program and a storage medium.

BACKGROUND ART

In the POD market, a great number of pages are printed by a great number of copies in most cases. In addition, various print styles are provided in the market such as printing for a large-capacity stacker, and finishing-conscious printing with stapling/saddle-stitch binding/case work binding or the like for each copy.

In general, printed materials cannot be taken out from a stacker until the printing job for the stacker is completed. In the case of stapling/saddle-stitch binding/case work binding, it is configured to bind sheets for each copy and the printed materials cannot be checked until the process is completed in order to prevent incorrect collating (incorrect ordering of the pages) and pages missing (redundancy or missing of pages). For the purpose of preventing them, most image forming apparatuses 10 are generally configured not to allow users to take out the printed material in the process of printing.

In addition, the image forming apparatuses 10 are configured to always keep providing consistent printing with various calibration functions.

Even with any sophisticated automatic correcting functions provided for the devices, users are quite likely to confirm the printed materials by themselves because they assume responsibility for the finished printed materials instead of assuming responsibility for the devices. That is to say, since the users are greatly concerned about consistency of color reproduction in the case of large amount of printing, they want to keep observing the printing state in succession so as to have printed materials with a high degree of perfection. To meet the demand, the image forming apparatus 10 with a function called "confirmation printing" have been proposed.

The "confirmation printing" is a function of printing two copies for the next page and outputting one of the copies to a stacker and the other one of the copies to a paper output tray in response to a user pressing a confirmation printing button at any time during the printing of the job. When paper sheets are fed in advance, two copies are printed for the page for which paper sheets are to be fed next.

That is, the "confirmation printing" is a function of intentionally printing an extra sheet for a page and outputting the sheet to a destination different from that of ordinary printing in addition to executing the ordinary printing so as to meet a user's demand for confirmation.

The "confirmation printing" function includes confirmation printing for each page and confirmation printing for each copy.

Japanese Patent Application Laid-Open No. 2007-72299 discusses a technique for specifying a page for which confirmation printing is to be executed from the pages for main printing included in the job, and setting the number of copies for the specified page is to be output in the image forming apparatus 10.

Since the "confirmation printing" function has complicated sequence control, however, it is implemented in some intelligent devices instead of being provided by any devices. That poses a problem in that a device without the confirmation printing function cannot execute the confirmation printing.

When the confirmation printing is set in an image forming apparatus, the settings for the confirmation printing is provided for the apparatus. That poses a problem in that users are bothered to perform an operation of changing the settings for the confirmation printing each time a job is completed in order to realize the confirmation printing with different settings for each of the jobs when multiple jobs are printed.

DISCLOSURE OF THE INVENTION

The present invention is directed to an information processing apparatus which is capable of creating a job which can be processed by an image forming apparatus, wherein the image forming apparatus prints and outputs a page for main printing included in the job received from the information processing apparatus according the job. The information processing apparatus includes: receiving means for receiving an instruction for setting confirmation printing in the image forming apparatus so that a confirmation page is printed in addition to the page for main printing and output to a destination different from that of the page for main printing according to an operation by a user on an application or a printer driver installed in the information processing apparatus; setting means for providing the settings for the confirmation printing for each of the jobs according to the instruction received by the receiving means; and sending means for sending the job with the settings for the confirmation printing provided by the setting means to the image forming apparatus.

According to the present invention, the settings for the confirmation printing are provided for each of the jobs so that the confirmation page is output to a destination different from that of the page for main printing. That enables the confirmation printing desired by the user to be provided for each of the jobs without regard of the order of the jobs to be printed and the functions of the image forming apparatus.

Further features of the present invention will become apparent from the following description of exemplary embodiments with reference to the attached drawings.

BRIEF DESCRIPTION OF THE DRAWINGS

FIG. 7 is a block diagram illustrating a configuration of a document processing system;

FIG. 13 is a diagram illustrating an example of sending a job in the first embodiment;

FIG. 14 is a diagram showing an example of a description of JDF for a job;

FIG. 16 is a diagram showing an example of a description of JDF for a job including post-processing;

BEST MODES FOR CARRYING OUT THE INVENTION

Exemplary embodiments of the present invention will be described in detail with reference to the appended drawings.

First Embodiment

Figure 1:
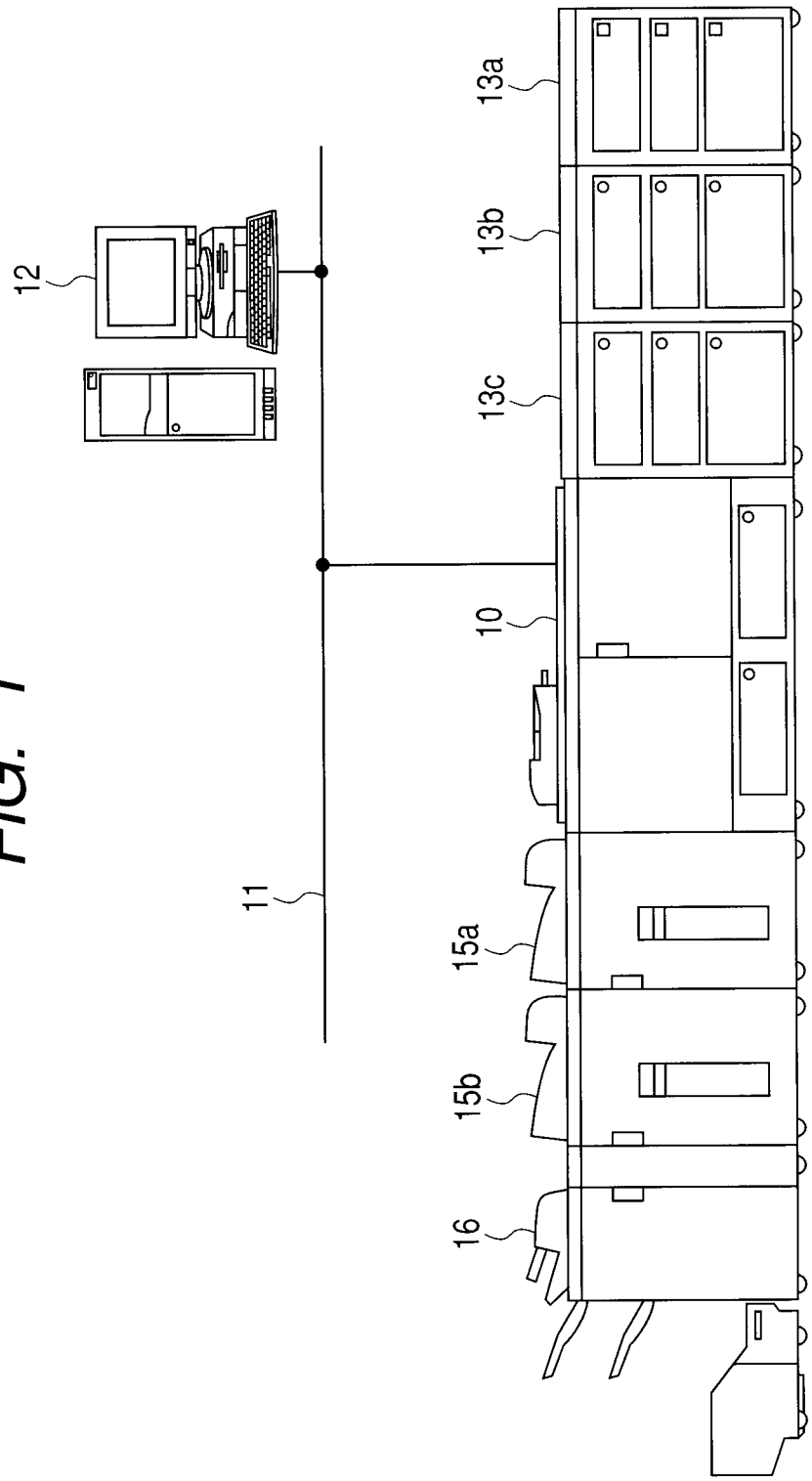
FIG. 1 is a conceptual diagram illustrating an example of a system configuration.

FIG. 1 is a conceptual diagram illustrating an example of a configuration of an image forming system applicable to the embodiment.

The figure includes a client PC 12 which is an information processing apparatus; and an image forming apparatus system (an image forming apparatus 10 and an accessory devices attached thereto), both of which are connected to a network 11.

The client PC 12 has applications (a general application 101 and a document processing system 20) installed therein. The client PC 12 is capable of creating a job which includes a page for main printing created on the application and sending the created job to the image forming apparatus 10.

The image forming apparatus 10 is a device for printing and outputting the page for main printing which is included in the job received from the client PC 12, according to the job.

A configuration of the image forming apparatus system will be further described with reference to FIG. 1. To the image forming apparatus 10, multiple accessory devices are connected.

First, there are large-capacity paper decks 13a, 13b, and 13c which are capable of storing a large amount of various types of paper source media.

Next, there are stackers 15a and 15b which are capable of stacking a large number of printed materials which have been printed and output. In addition, a saddle-stitch binding apparatus (finisher) 16 for saddle-stitch binding is also included. The saddle-stitch binding apparatus 16 also includes a stapling function, inserter function, sheet-folding function, and trimming function, as well as the saddle-stick binding function.

The accessory devices may be attached to the image forming apparatus 10 in any combination by independently connected thereto or removed therefrom. The accessory devices may also be connected to the image forming apparatus 10 in any order to make an unrestricted combination, if only they can be physically connected.

Multiple paper decks and stackers may be connected here. If multiple paper decks and stackers are connected, the paper decks and stackers connected to the image forming apparatus 10 can process the recording media among themselves by using inner sheet conveyance paths. They are also configured to provide the sheet conveyance for the recording media from other paper decks and stackers.

Figure 2:
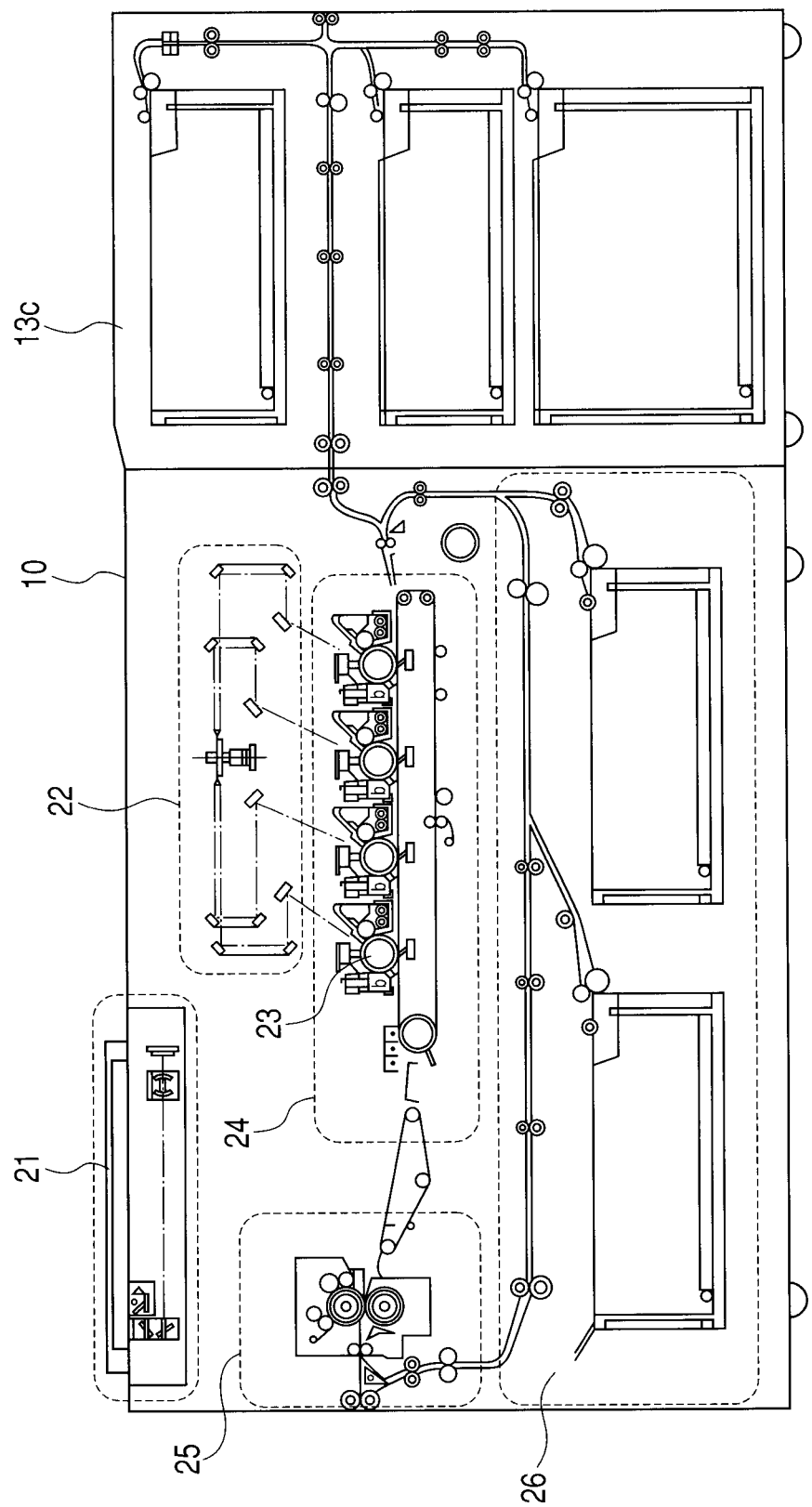
FIG. 2 is a conceptual diagram illustrating a configuration of an image forming apparatus.

Now, each component of the image forming apparatus 10 will be described with reference to FIG. 2.

The image forming apparatus 10 includes a scanner unit 21, a printer unit, and a controller unit. Here, the printer unit includes a laser exposing unit 22, a photosensitive drum 23, an image creating unit 24, a fixing unit 25, a sheet feeding/conveyance unit 26, and a printer controlling unit (not shown) for controlling over the aforementioned components. The controller unit will be described later.

The scanner unit 21 optically scans the original image by lighting the original document placed on the platen glass, converts the image into electrical signals and generates the image data.

The laser exposing unit 22 allows an incident light of a beam such as laser light which has been modulated according to the image data generated in the scanner unit 21 onto a multi-face mirror (polygon mirror) which rotates at an equal speed and irradiates the photosensitive drum 23 as reflective scanning light.

The image creating unit 24 drives the photosensitive drum 23 to rotate so as to electrify the photosensitive drum 23 by the electrizer. Then, the image creating unit 24 develops the latent image formed on the photosensitive drum 23 by the laser exposing unit 22 with toner, and transfers the toner image onto the sheet member. The image creating unit 24 also executes a series of electrophotography process for gathering minute toner remaining on the photosensitive drum 23 without being transferred at that time.

The fixing unit 25 is made up of a combination of rollers and belts, has a heat source such as a halogen heater, and melts and fixes the toner on the sheet member to which the toner image is transferred by the image creating unit 24 with heat and pressure.

The sheet feeding/conveyance unit 26 has one or more sheet member storages represented by a cassette and paper deck, separates a sheet member from the sheet members stored in the sheet member storage in response to an instruction from the printer controlling unit, and conveys the sheet member to the image creating unit 24 and the fixing unit 25. In the case of forming images on both sides of the sheet member, the printer controlling unit provides control so that the sheet member which has passed through the fixing unit 25 passes through the conveyance path which is for conveying the sheet member to the image creating unit 24 again.

The paper deck 13c is an expandable sheet member storage, and stores a large number of sheet members in advance so that it can feed sheets in response to an instruction from the printer controlling unit, as an inner deck which has been prepared in the sheet feeding/conveyance unit 26.

The printer controlling unit communicates with the controller unit which controls over the entire image forming apparatus 10 and provides control in response to an instruction, while controlling the above-described scanner unit, laser exposing unit, image creating unit, fixing unit, and sheet feeding/conveyance unit to smoothly operate in harmony by managing the states of scanner, laser exposure, image creation, fusing, and sheet feeding/conveyance.

Now, the operations of components of the image forming apparatus 10 from the power OFF state to the state ready to start the operations will be outlined. When the power is turned on, the printer controlling unit instructs the scanner unit 21, the laser exposing unit 22, the image creating unit 24, the fixing unit 25, and the sheet feeding/conveyance unit 26 to start preparing operations. Then, the printer controlling unit waits for starting the communication with the controller unit which manages the entire of the image forming apparatus 10. When the communication with the controller unit is established, the printer controlling unit and the controller unit exchange the specifications thereof. When the preparing operations finish and the components become ready to start the image forming operation, the printer controlling unit notifies the controller unit that the image forming apparatus 10 is ready to start the operation.

The printer controlling unit notifies the controller unit of the device states of the components. Here is an example of the notification. First, the sheet feeding/conveyance unit 26 detects the sizes of the sheet members stored in the storages, the residual quantities (the loads) of the sheet members stored in the storages, and the operating state of the driving unit (whether it is ready to operate or out of order), and notifies them. Next, the image creating unit 24 notifies the amount of toner contained in toner container.

Now, the operations of components from when an operation instruction is sent from the controller unit in the state ready to operate to when a series of printing operations are executed and finished will be outlined. First, the controller unit sends an operation start command to the printer controlling unit. When the printer controlling unit receives the operation start command, it instructs the laser exposing unit 22, image creating unit 24, sheet feeding/conveyance unit 26, and fixing unit 25 to start the printing operations. The laser exposing unit 22 starts rotation of a motor (polygon motor) which drives the polygon mirror. The image creating unit 24 drives the photosensitive drum 23 to rotate so as to electrify the photosensitive drum 23. The fixing unit 25 turns on the fusing heater to heat it to the temperature which can fix the toner on the sheet member onto the sheet member. The sheet feeding/conveyance unit 26 causes the driving device (motor) to enter the state ready to convey. When the components are ready to operate, the printer controlling unit notifies the controller unit of the completion of preparation. When the controller unit receives the notification of the completion of preparation from the printer controlling unit, it instructs the printing operations for each page. In the case of a printing job for ten pages by twenty copies, for example, the controller unit issues a printing operation instruction for 200 pages. When the print controlling unit receives the printing operation instruction, it issues a sheet feeding instruction to the sheet feeding/conveyance unit 26. When the sheet member is available for feeding, the sheet feeding/conveyance unit 26 feeds and conveys a sheet member. When the sheet member arrives at a predetermined location, the sheet feeding/conveyance unit 26 notifies the print controlling unit of the arrival at the predetermined location. If the sheet member is unavailable for feeding such that no sheet member is left in the storage, the sheet feeding/conveyance unit 26 notifies the print controlling unit that the sheet feeding is impossible. The sheet feeding/conveyance unit 26 further includes a multi-feeding detecting sensor which detects overlapped sheet members (multi-feeding state) are conveyed on the conveyance path, and a thickness detecting sensor which detects the thickness of the sheet member. When any of the sensors detects multi-feeding or abnormal condition, a sheet feeding/conveyance device interrupts the sheet feeding operation or the conveyance operation and notifies the print controlling unit of the abnormality. In such a case, the print controlling unit notifies the controller unit of the reason for the interruption of the operation, or the location of the sheet member remaining in the apparatus. When the sheet member is normally conveyed and arrived at the predetermined location, the print controlling unit instructs the image creating unit 24 to start image creation in response to the notification of the arrival of the sheet member at the predetermined location from the sheet feeding/conveyance unit 26. Under the timing control, the toner image is transferred to the sheet member. Although the fixing unit 25 controls itself to be at an appropriate fusing temperature by monitoring the temperature of itself, the temperature of itself may decrease if the sheet member takes away too much heat from the fixing unit 25. In such a case, the fixing unit 25 notifies the print controlling unit that the temperature of the fixing unit 25 decreased. In response to the notification, the print controlling unit controls to convey the sheet members with a wider interval to prevent the temperature of the fixing unit 25 from decreasing further. If the temperature of the fixing unit 25 is still not recovered, the print controlling unit interrupts the operation once, and when the temperature is recovered, the print controlling unit controls to resume the operation. When all of the sheet members have been output, the print controlling unit instructs the units to stop the operations, and in response to the operation stop notification from the units, the print controlling unit notifies the controller unit of the end of the operation.

Figure 3:
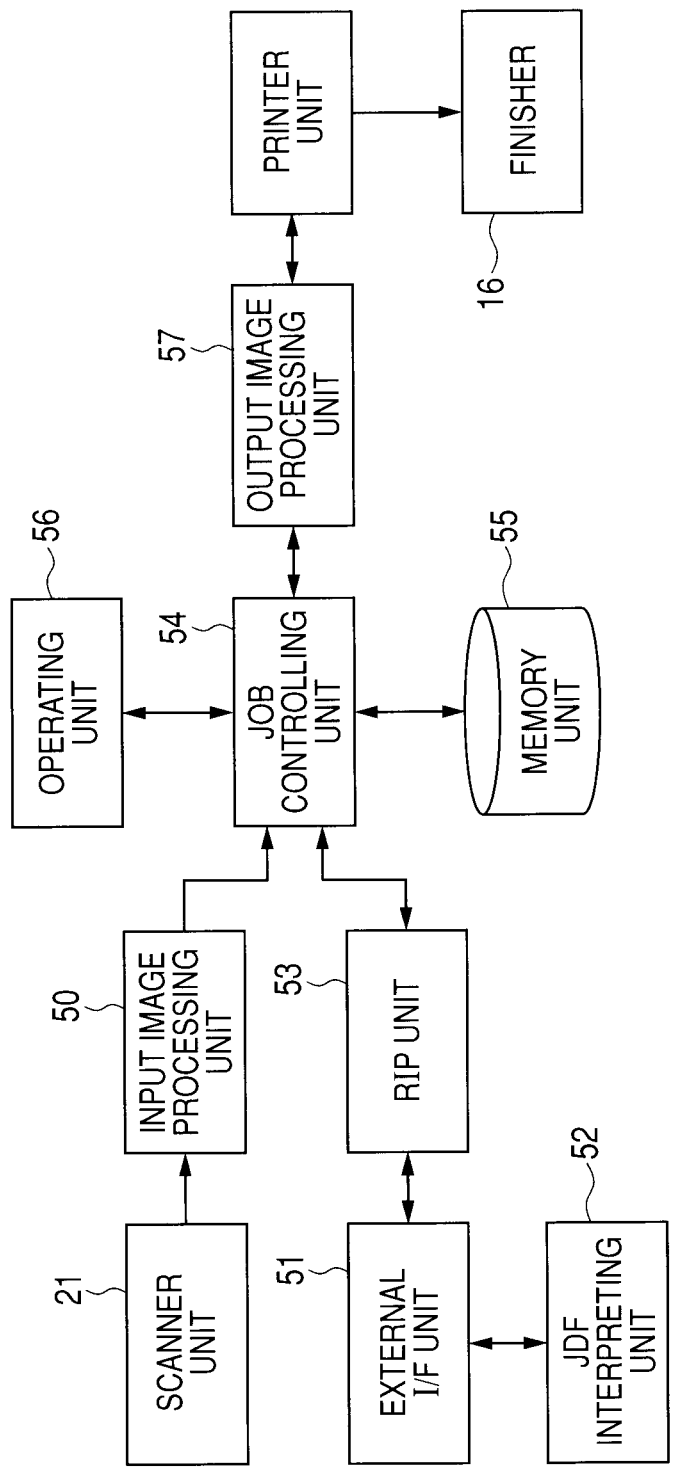
FIG. 3 is a block diagram illustrating a configuration of a controller unit.

Now, the configuration and the operations of the controller unit will be described with reference to FIG. 3. Here, although FIG. 3 is a block diagram illustrating the configuration of the controller unit, the controller unit is a general term for the components 50 to 57 in FIG. 3.

An input image processing unit 50 executes an inputting process on image data of a paper document or the like scanned by the scanner unit 21.

An external I/F 51 receives a job including image data which is input via the network 11 and sends the image data and apparatus information inside the controller unit to outside via the network 11. An RIP unit 53 is a unit for interpreting received PDL (Page Description Language) data and executing RIP (Raster Image Processor) conversion.

If the data received by the external I/F 51 is a job defined by the JDF (Job Definition Format), content of the job ticket is interpreted at a JDF interpreting unit 52 from the JDF added to the job, and sent to the RIP unit 53.

Then, the data converted at the RIP unit 53 is sent to a job controlling unit 54. The job controlling unit 54 plays a role of traffic control for controlling input data and output data.

The data input into the job controlling unit 54 is held in a memory unit 55 once. The held data is temporarily stored there or called if needed.

An output image processing unit 57 executes image processing for the purpose of printing the image data included in the data received from the job controlling unit 54, and sends the result to the printer unit.

In the printer unit, the sheet member is fed and the image data prepared by the output image processing unit is sequentially printed on the sheet member. The printed material is conveyed to the finisher 16 where a sorting process or a finishing process is provided for the sheet member.

Figure 4:
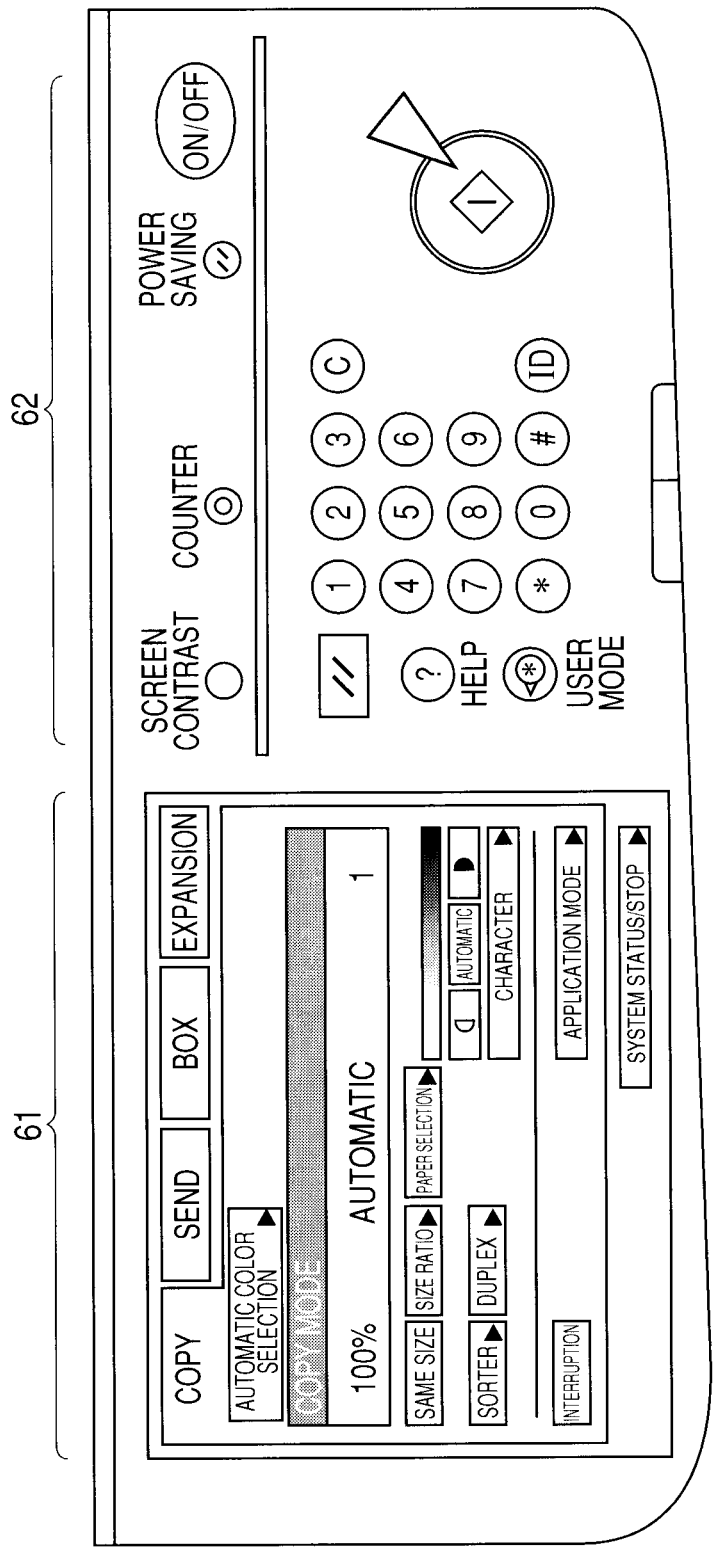
FIG. 4 is a schematic diagram illustrating an example of a configuration of an operating unit.

An operating unit 56 is for selecting the above-described various flows and functions and for instructing operations. As the operating unit 56 has a display unit of higher resolution, it provides users with a use of performing a print preview of the image data in the memory unit 55, and after confirmation, if the user thinks it is all right to print the image, performing a printing process. The operating unit 56 includes a touch panel unit and a key input unit shown in FIG. 4.

Figure 5:
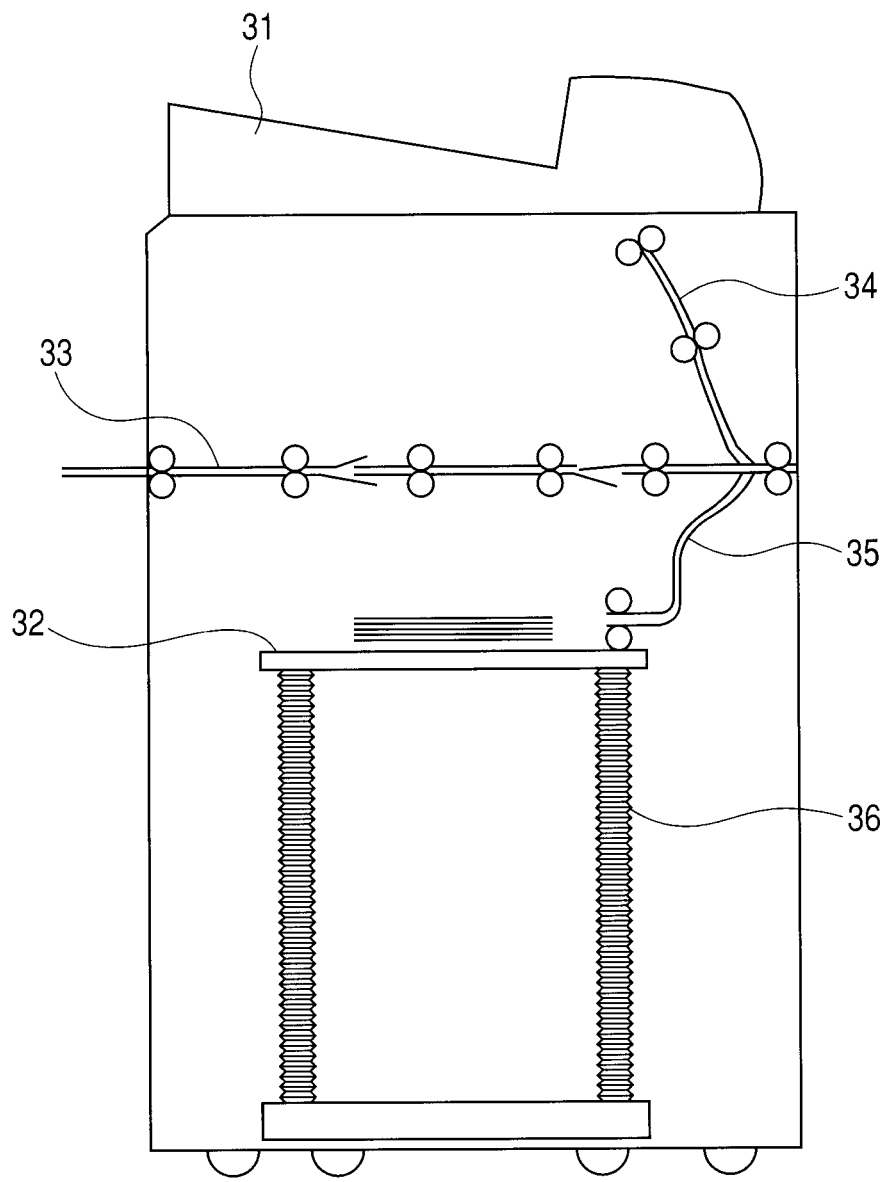
FIG. 5 is a conceptual diagram illustrating a configuration of a stacker.

Now, the stacker 15a will be described with reference to FIG. 5. FIG. 5 is a conceptual diagram illustrating a configuration of the stacker 15a. The stacker 15 has the same configuration as that of the stacker 15a.

The stacker 15a to which the sheet member is conveyed has three paths for outputting the sheet member: a straight path 33, an escape path 34, and a stack path 35.

First, the straight path 33 is for conveying the sheet member to the finisher 16 at the following stage, instead of outputting the sheet member to the stack tray 32.

Next, the escape path 34 is used for outputting the sheet member to a sample tray 31, instead of outputting the sheet member to the stack tray 32. In such a case where a user wants to confirm the printed material (confirmation printing) on the system without the finisher 16 connected thereto at the latter stage, it is convenient to have the sample tray 31 from which the user can take out the sheet member instead of bothering to take out it from the stack tray 32.

Next, the stack path 35 is for outputting the sheet member to the stack tray 32. The sheet member output from the stack path 35 is stacked in the stack tray 32. The stack tray 32 is loaded on an expandable stay. A shock absorber is attached to the joined portions with the stack tray 32. Below the expandable stay is a cart, and the printed materials output to the stack tray 32 loaded on the cart can be carried to another off-line finisher by attaching a handle (not shown) to the cart.

When the front door of the stacker 15a is closed, the expandable stay is at an upper portion where the printed material output to the stack tray 32 is easily stacked. The stack tray 32 is adapted to be lowered when the front door is opened (or, instructed to be opened).

As to the stacking way of the printed materials on the stack tray 32, flat stacking or shifted stacking may be performed. In the flat stacking way, the printed materials are literally stacked in the same position. In the shift stacking way, the printed materials are stacked in increments of each predetermined numbers of copy or in increments of jobs, shifted in the front and back direction, and divisions are created for simplifying handling of the printed materials.

Figure 6:
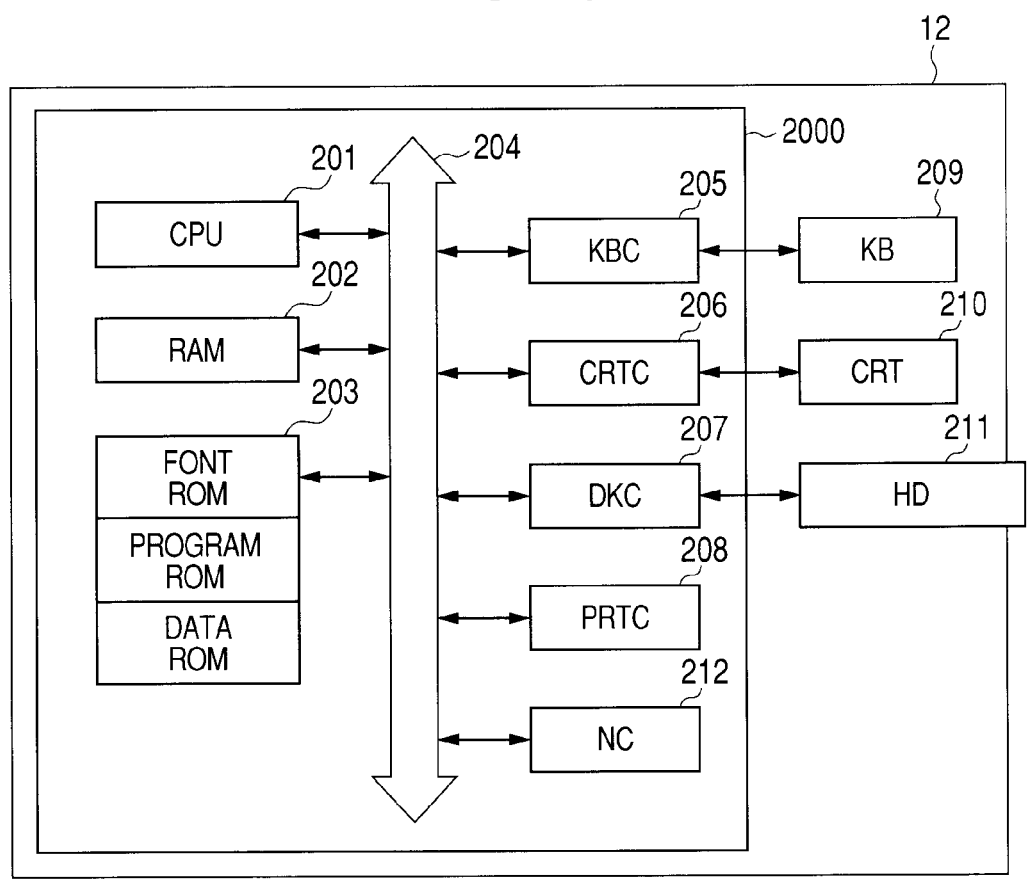
FIG. 6 is a block diagram illustrating a configuration of a client PC.

Now, the client PC 12 which is applied to the embodiment will be described with reference to FIG. 6. FIG. 6 is a block diagram illustrating a hardware configuration of a client PC 12.

A CPU 201 executes a program stored in the ROM for program in a ROM 203 or a program loaded from a hard disk 211 to a RAM 202. The programs executed by the CPU 201 are an OS (operating system) or the general application 101 and document processing system 20 to be described later, for example. The RAM 202 functions as a main memory, a work area and the like for the CPU 201. A keyboard controller (KBC) 205 controls key input from a keyboard 209 or a pointing device (not shown). A CRT controller (CRTC) 206 controls a display on a CRT display 210. A disk controller (DKC) 207 controls access to the hard disk (HD) 211, floppy (registered trademark) disk (FD) and the like which store a boot program, various applications, font data, a user file, an edited file to be described later and the like. A PRTC 208 controls exchanging of signals with an external apparatus connected thereto. An NC 212 is connected to the network 11, and executes a controlling process for communication with another apparatus which is connected to the network 11 such as for sending a job.

Now, the document processing system 20 according to the present invention will be outlined with reference to FIG. 7. The document processing system 20 includes an electronic document writer that converts a data file created by the general application 101 into an electronic document file, and a book-binding application 104 that provides a function of editing the electronic document file. In addition, the document processing system 20 enables creating and editing of a document in which multiple data files created by the general application 101 are merged, thereby improving the operability so that a document can be edited efficiently.

FIG. 7 is a diagram illustrating a software configuration of the document processing system 20 of the embodiment. Here, the document processing system 20 is stored in the ROM 203 or the HD 211 of the client PC 12 as a program and implemented when the CPU 201 executes the program.

The general application 101 shown in FIG. 7 is an application program for providing a function of word-processing, spread-sheet, photo-retouching, draw, or painting, presentation, text editing or the like. Each of the general applications 101 has a printing function with respect to the OS. That is to say, a predetermined interface provided by the OS is used for printing a data file such as document data or image data created by the general application 101. Specifically, in order to print the created data file, the general application 101 sends a predetermined output command in an OS dependent format to the output module of the OS which provides the above-described interface. The output module which receives the output command converts the output command into a format which the output device such as a printer can process and outputs the converted command (called DDI function) in turn. Since the format which the output device can process differs for the device types, manufacturers, and models, a device driver is prepared for each device. The OS uses the device driver to convert the output command, generate print data, and generate a job by defining the job using a JL (Job Language). For example, when Windows (registered trademark of Microsoft) is used as the OS, the output module called GDI (Graphic Device Interface) is worth as the above-described output module.

The electronic document writer 102 is an improved version of the above-described device driver, and a software module which is provided for the purpose of implementing the present document processing system 20. The electronic document writer 102, however, does not intend to output a command to a specific device, thus, the output command is converted by using the book-binding application 104 or a printer driver 106 (described later). The output command may be converted by the electronic document writer 102 into any format (hereinafter, called an electronic document format); if only a document for each page can be represented in a detailed format. Among virtual standard formats, PDF format by Adobe Systems or SVG format, for example, may be adopted as the electronic document format.

In the case where the electronic document writer 102 is used from the general application 101, the general application 101 executes printing after specifying the electronic document writer 102 as a device driver to be used for outputting. The electronic document file created by the electronic document writer 102 is not in a perfect format as the electronic document format, however. For that reason, it is the book-binding application 104 that specifies the electronic document writer 102 as a device driver, and under the control of the book-binding application 104, conversion of the application data into an electronic document file 103 is executed. Then, the book-binding application 104 completes that new imperfect electronic document file which is generated by the electronic document writer 102 as the electronic document file 103 in a format to be described later. When the differences need to be clearly distinguished, the data file created by the electronic document writer 102 is called "the electronic document file", and the electronic document file which is structured by the book-binding application 104 is called "the book file" below. When the differences need not to be distinguished in particular, all of the data file generated by the general application 101, the electronic document file, and the book file are called a document file (or document data).

By making the general application 101 print the data with the electronic document writer 102 specified as the device driver as described above, the application data is converted into the electronic document format for each page which is defined by the general application 101. The page defined as described above will be called a logical page or a document page. Then, the page is stored as the electronic document file 103 in the storage medium such as a hard disk. The hard disk may be a local drive provided for the client PC 12 which implements the document processing system 20 of the embodiment, or if the client PC 12 is connected to the network 11, may be a drive provided on the network 11.

The book-binding application 104 reads in the electronic document file (or the book file) 103 and provides a function of editing the file for the user. The book-binding application 104 does not provide a function of editing the content of each page, however, and provides a function of editing the structure of the section or book to be described later which is made up of pages each of which is the minimum unit.

The book-binding application 104 activates an electronic document despooler 105 to print the book file 103 which the book-binding application 104 edited. The electronic document despooler 105 is a program module which is installed in the client PC 12 together with the book-binding application 104 and used for outputting drawing data to the printer driver 106 in printing the book file 103. The electronic document despooler 105 reads out the specified book file 103 from the hard disk. In order to print each page in a format described in the book file, the electronic document despooler 105 generates an output command complying with the output module of the OS described above, and outputs the command to the output module (not shown). At this time, the printer driver 106 for the image forming apparatus 10 used as an output device is designated as a device driver. The above-described output module converts the received output command into a device command and outputs the device command to the specified printer driver 106. The printer driver 106 converts the received device command into a command in a page description language or the like which can be interpreted and executed by the image forming apparatus 10. Then, the converted command is sent from the printer driver 106 to the image forming apparatus 10 as a job via the network 11. The image according to the job is printed.

When the type of the job is JDF job, the job is processed in a JDF job creating unit 107. Specifically, the JDF job creating unit 107 converts the output command created by the electronic document despooler 105 into JDF. Also, the JDF job creating unit 107 converts the book file created by the book-binding application 104 into PDF. Then, the JDF job creating unit 107 packages the JDF data and PDF data with MIME encode and sends the package to the image forming apparatus 10.

Here, the data format of the book file 103 which is applied to the embodiment will be described. The book file 103 has a three-layer hierarchical structure modeled after writing on a paper medium. The uppermost layer is called as a "book" and is modeled after a book of a single volume with attributes relating to the book in general defined. The underlying intermediate layer corresponds to a section in book terminology and therefore is called as a "section". For each section, it is possible to define a section attribute. The lowermost layer is called as a "page" and corresponds to each page of the data file defined by the general application 101. For each page there can be defined a page attribute. A single book may include multiple sections, and a single section can include multiple pages.

Figure 8A:
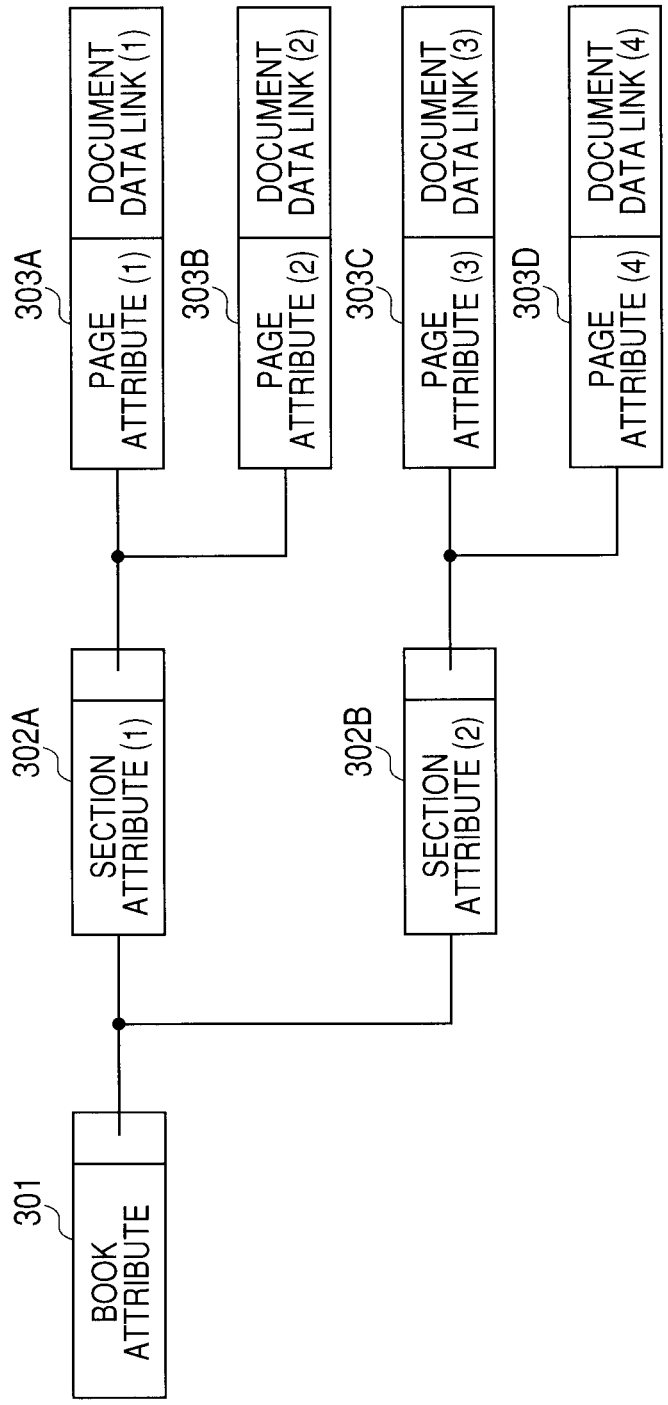
FIGS. 8A and 8B are schematic diagrams illustrating an example of a book file format.

FIG. 8A is a diagram schematically illustrating an example in the format of the book file 103. As illustrated, a book, sections, and pages in the book file 103 of this example are displayed by nodes corresponding to them. One book file 103 contains one book. Since book and section are concepts for defining a structure in the form of a book, defined attribute values and links to lower layers are included as substance. A page has the data of each page output by the application program as substance. A page, therefore, includes not only the attribute value but also the substance (document page data) of a document page and links to each document page data.

There are cases where a printed page for when the page is to be output to a paper medium or the like includes multiple document pages. Items relating to this structure are not displayed by links but are displayed as attributes in each of the book, section and page layers.

Figure 8B:

In FIGS. 8A and 8B, a book attribute has been defined for a book 301 and two sections 302A and 302B are contained in the book 301 is displayed by the links. The links show that the sections 302A and 302B are contained in the book 301. It is also shown that pages 303A and 303B are linked to section 302A, and that the pages are contained in the section. Attribute values have been defined for each of the pages 303A and 303B, and the pages include links to document page data (1), (2), which is the substance of these pages. These links point to data (1), (2) of document page data 304 as illustrated in FIG. 8B, and indicate that the substance of pages 303A and 303B is the document page data (1), (2).

The book file 103 has the structure and contents as described above. The book file 103 is created by the book-binding application 104 and the electronic document writer 102 based on the data file of the general application 101. As for the generated book file 103, the sections and pages can be edited by the book-binding application 104.

The book file 103 which is created and edited as described above has the printed and output materials as the end purpose. Accordingly, when the user selects a file menu from a UI screen 1100 of the book-binding application 104 shown in FIG. 9 and selects printing from the menu, the book file 103 is printed by the specified output device (for example, the image forming apparatus 10) and output as the printed material. At this time, first, the book-binding application 104 creates a job ticket from the currently open book file 103 and then delivers the job ticket to the electronic document despooler 105. The electronic document despooler 105, in turn, converts the job ticket to an output command of the operating system, for example, to a GDI function in the Windows (the registered trademark of Microsoft), and sends the output command to an output module, for example, a GDI. The output module generates a command, which is suited to the device, by the specified printer driver 106 and sends the command to the device.

Here, the job ticket is data having the structure in which the document page is the minimum unit. The structure of the job ticket defines the layout of document pages on the paper. One job ticket is issued per job. As a consequence, first, the highest level has a node that is a document, and attributes of the overall document, for example, duplex printing/simplex printing and the like have been defined. Underlying this is a paper node, and this includes attributes such as the identifier of the paper to be used and designation of a paper-feed port in the printer. Belonging to each paper node is the node of a sheet to be printed on the paper. One sheet corresponds to one paper. A printed page (physical page) belongs to each sheet. One physical page belongs to one sheet in case of the simplex printing, and two physical pages belong to one sheet in case of duplex printing. Belonging to each physical page is a document page disposed thereon. Layout of document pages is included as an attribute of a physical page.

The electronic document despooler 105 converts the above-described job ticket into the output command to the output module.

The document processing system 20 of the embodiment has been outlined above. Although this is a stand-alone system, a server-client system that is an extension of the above system also can create and edit a book file 103 through a similar configuration and procedure. The book file 103 and the printing process, however, are managed by servers.

Figure 10:
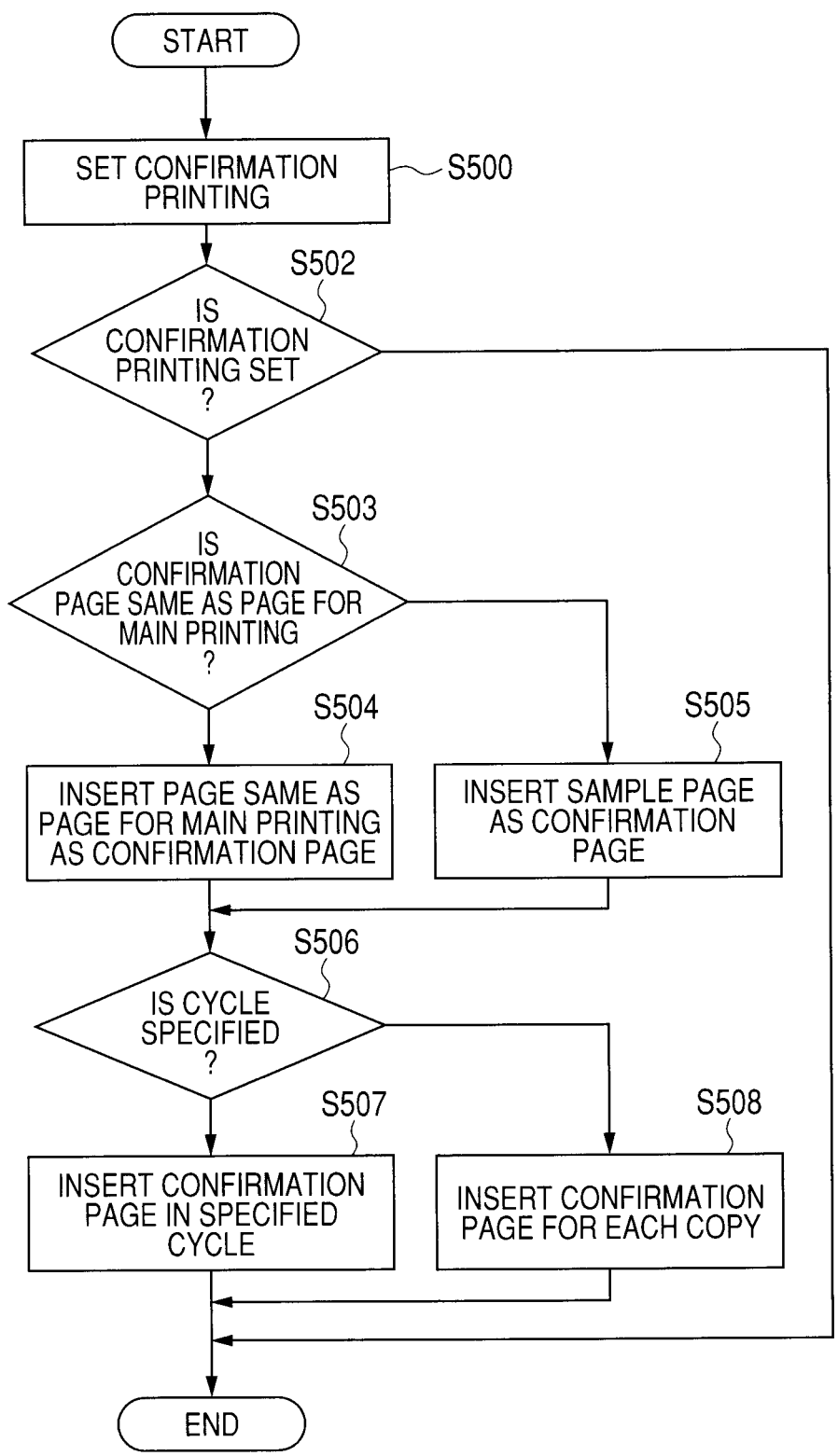
FIG. 10 is a flowchart for setting confirmation printing in a first embodiment.

Now, the confirmation printing setting process in the above-described document processing system 20 will be described with reference to the flowchart shown in FIG. 10. The process shown by the flowchart in FIG. 10 is implemented by the CPU 201 executing the program in the ROM 203 or HD 211. As the document, the image shown in FIG. 11 has already been captured in the document processing system 20.

In step S500, according to the operation on the screen of the document processing system 20 by the user using the keyboard 209, the pointing device and the like, the settings for the confirmation printing is asked for the job. Here, the confirmation page which is output to a destination different from that of the page for main printing when the confirmation page is output as the printed material in the image forming apparatus 10 according to the confirmation printing setting will be described. The confirmation page may be a page same as an arbitrary page in the pages for main printing or an arbitrary page other than the pages for main printing (for example, the sample page for calibration). In addition, the confirmation page is not limited to a single page. It may be configured to execute the confirmation printing by setting multiple pages or the entire job (copy) as the confirmation page.

In addition to the above description, it may be configured to set the destination of the page for main printing, the destination of the confirmation page, the cycle of outputting the confirmation page and the like as the settings for the confirmation printing according to the operation by the user with the keyboard 209, the pointing device and the like.

As described above, with the settings for the confirmation printing for each job provided in the client PC 12, the confirmation printing with different settings for each job can be implemented in printing the jobs by the image forming apparatus 10. Accordingly, even when multiple jobs are processed by the image forming apparatus 10, the confirmation printing desired by the user can be implemented without regard of the order of the jobs, which lightens the user's workload by saving the user such necessity to set the confirmation printing each time a job is completed.

In step S502, whether the confirmation printing is set for the book file 103 or not is determined. If it is determined that the confirmation printing is set, the flow proceeds to step S503. If it is determined that the confirmation printing is not set, the flow jumps to step S509.

In step S503, whether the page set as the confirmation page in the settings for the confirmation printing is the same as the page for main printing in the book file 103 or not is determined. If it is determined that it is the same as the page for main printing, the flow proceeds to step S504. If it is determined that it is not the same as the page for main printing, the flow jumps to S505.

In step S504, the page same as the page for main printing which is set as the confirmation page is inserted in the job as the confirmation page.

In step S505, an arbitrary page other than the page for main printing is inserted in the job as the confirmation page. It is also configured that an arbitrary page according to the user's selection or specification is set as the arbitrary page other than the page for main printing. It is also configured that the document processing system 20 prepares pages other than the page for main printing as the confirmation page so that the prepared page is set as the confirmation page according to the user's selection of making the page other than the page for main printing the confirmation page.

Here, the position where the confirmation page is inserted in the job in steps S504 and S505 may be before or after the page for main printing set or before or after the overall job. It is also configured that the user can set an arbitrary inserting position in setting the confirmation page.

In step S506, whether the cycle of outputting the confirmation page is specified by the user or not is determined. If it is determined that the cycle of outputting is specified, the flow proceeds to step S507. If it is determined that the cycle of outputting is not specified, the flow jumps to S508.

In step S507, the confirmation page is inserted in the job according to the cycle of outputting which is specified by the user (for example, once in ten copies).

In step S508, since the cycle of outputting is not specified by the user, the confirmation page is inserted in the job so that the confirmation page is output for each copy.

The function of confirmation printing can be implemented also in the image forming apparatus 10 which has no function of confirmation printing, if the user specifies with the above-described process to print the job which has the confirmation printing set.

Figure 9:
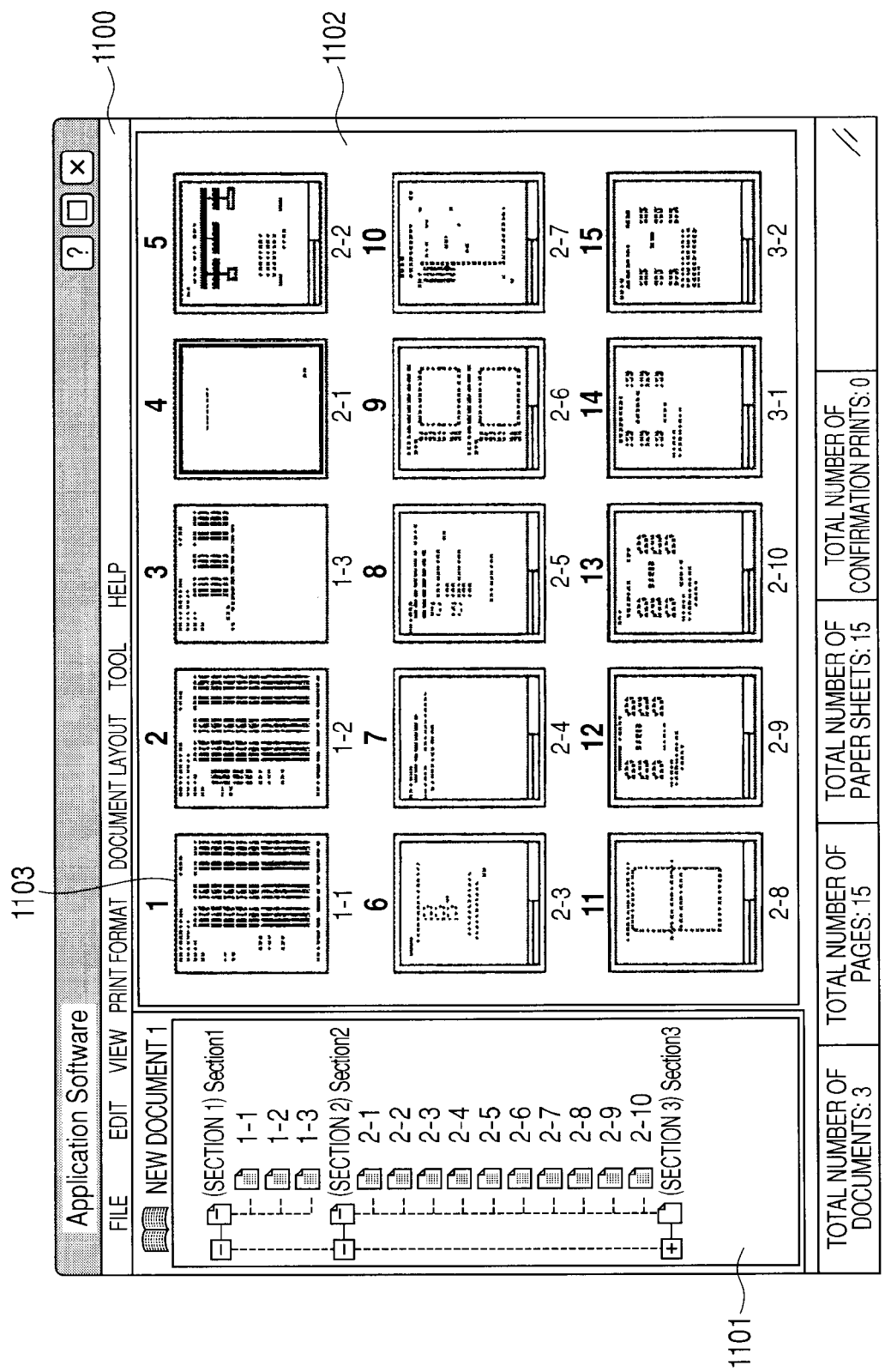
FIG. 9 is a diagram showing an example of a UI of the document processing system.

Now, a print preview display in the document processing system 20 will be described. As described above, when the book file 103 is opened by the book-binding application 104, the user interface screen 1100 shown in FIG. 9 is displayed on the CRT 210. Such display is implemented by the CPU 201 executing the program in the ROM 203 or HD 211 to control the CRT 210.

In a tree part 1101, a tree indicating the structure of the opened book file 103 (hereinafter, referred to as a "book concerned") is displayed. In a preview part 1102, preview of book concerned is displayed according to the user's specification. Two display styles are prepared here for the preview. First, the first mode is called an all pages preview mode for displaying the pages for main printing as they are. In that mode, the reduced contents of the pages for main printing belonging to the book concerned are displayed. The display in the preview part 1102 does not reflect the layouts. Next, the second mode is called a finishing preview mode. In that mode, the pages for main printing are displayed in the preview part 1102 with the layouts which have been edited by the book-binding application 104 reflected.

Figure 11:
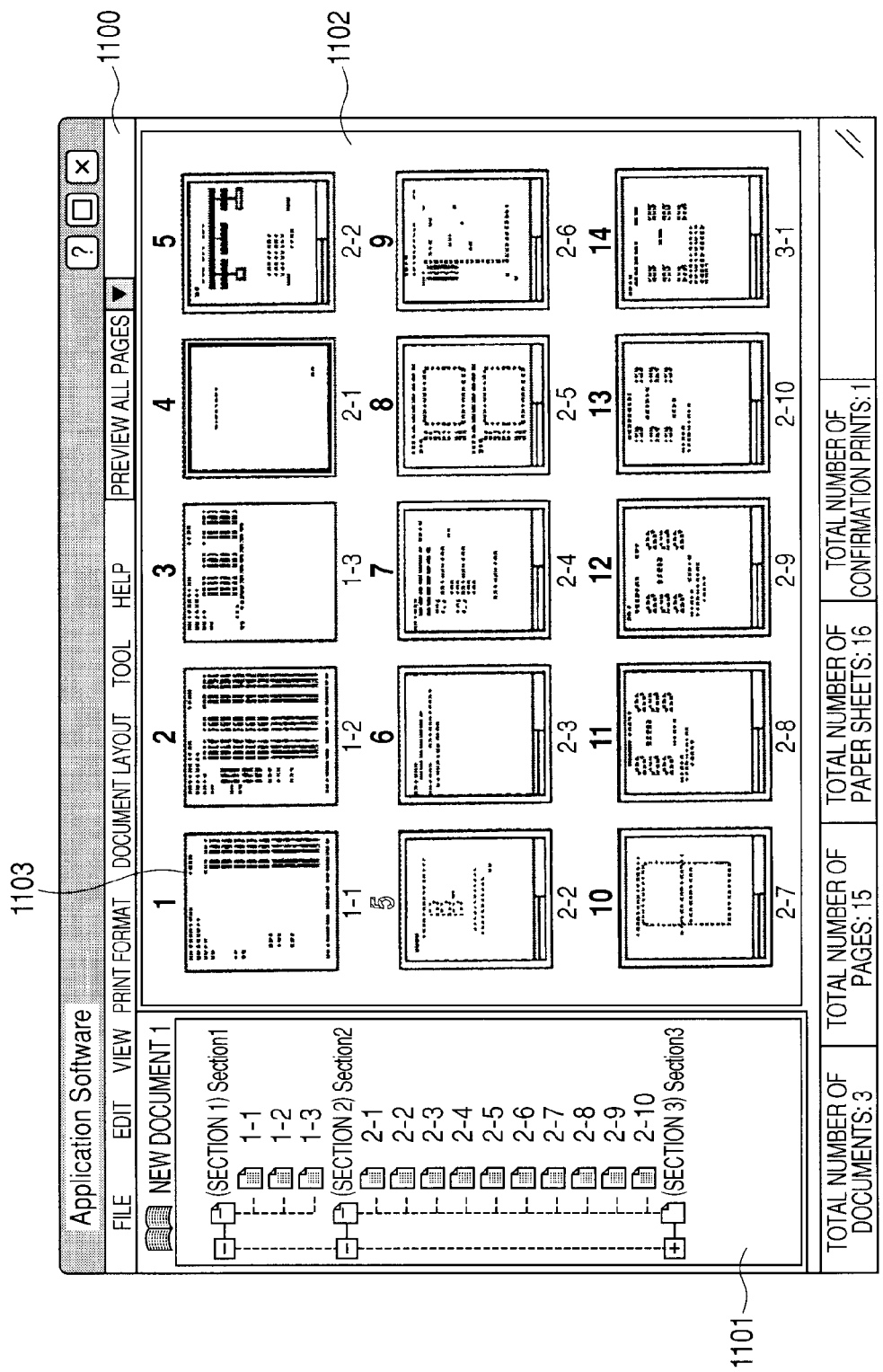
FIG. 11 is a diagram illustrating an example of an all pages preview screen.
Figure 12:
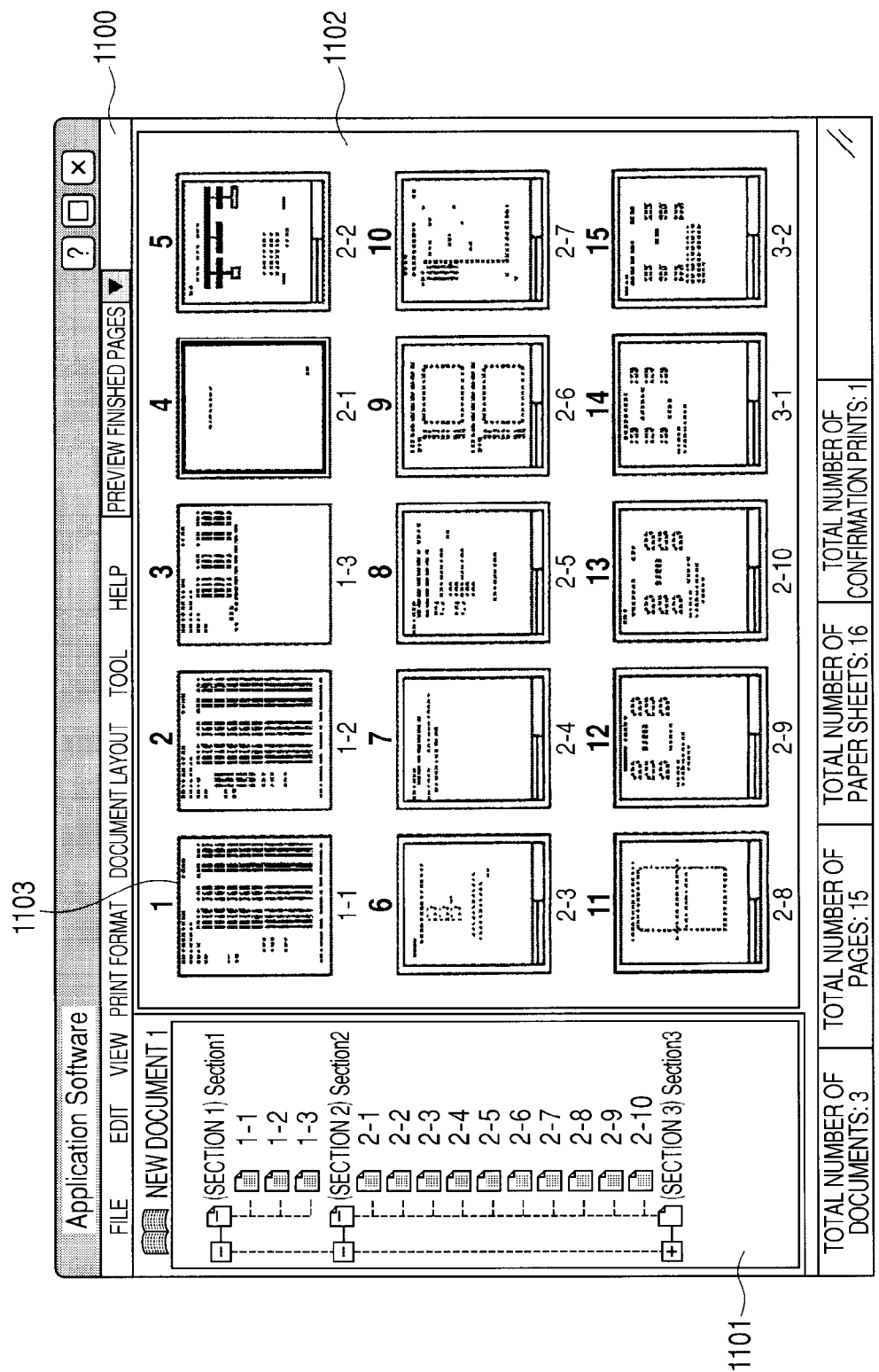
FIG. 12 is a diagram illustrating an example of a finishing preview screen.

FIG. 11 and FIG. 12 are diagrams illustrating the all pages preview screen and finishing preview screen where the fifth page in the pages for main printing (the second page in the second section) is set as the confirmation page. FIG. 11 is a screen displaying the all pages preview in which the fifth page is displayed twice as the page for main printing and the confirmation page, thus, the confirmation page is included in the preview. FIG. 12 is a screen displaying the finishing preview in which the fifth page is displayed only once as the page for main printing, thus, the confirmation page is not included in the preview. Those print previews are switched by the CPU 201 controlling the document processing system 20 according to the user's operation. By switching the confirmation page display with the preview modes in that manner, the actual printed materials and the status of the settings for the confirmation page can be easily viewed. The preview of the confirmation page is not limited to the above-described method. For example, it can be distinguished from the page for main printing as a page of different type than that of the page for main printing by displaying the confirmation page in a different color, with dotted lines, or otherwise manner. The preview part 1102 may be separated for displaying the pages for main printing and the confirmation page in different windows.

Now, sending of the job from the client PC 12 to the image forming apparatus 10 in the document processing system 20 will be described in detail.

The CPU 201 sends the image data (the pages for main printing and confirmation page) and the job ticket to the image forming apparatus 10 as a job based on the print instruction from the user in the document processing system 20. The image data is general PDL data (page description language data) for which PDF data is used in the most cases among others since it is easily handled for previewing. On the other hand, as for the job ticket, although JDF (Job Definition Format) data is widely known in general, the other job setting means (including a command) may be used. FIG. 13 is a diagram illustrating an example of sending a job. FIG. 13 shows an example of sending a job in the form of PDF+JDF. The job is sent and received in a MIME package using the HTTP protocol for the most cases. The CPU 201 sends the job by controlling the NC 212.

The data sent in the form PDF+JDF is received by the image forming apparatus 10, and the job ticket is interpreted by the JDF interpreting unit 52 shown in FIG. 3. PDF is further converted by the RIP unit 53 and sent to the printer unit.

Here, FIG. 14 is a diagram showing an example of a description of JDF for the pages for main printing and the confirmation page which are displayed in the preview shown in FIG. 11. That means when the job ticket is defined with JDF ID=J1, JobPartID=ID0, the first through fifth pages of the pages for main printing are output to a Stacker-A. Similarly, the sixth page which is the confirmation page is output to a SampleTray-A, and the seventh through fifteenth pages of the pages for main printing are also output to the Stacker-A. The description on JDF shown in FIG. 14, however, describes the page number with the value less than the actual page number by one like "0" for the first page, "1" for the second page, and so on.

Figure 15:
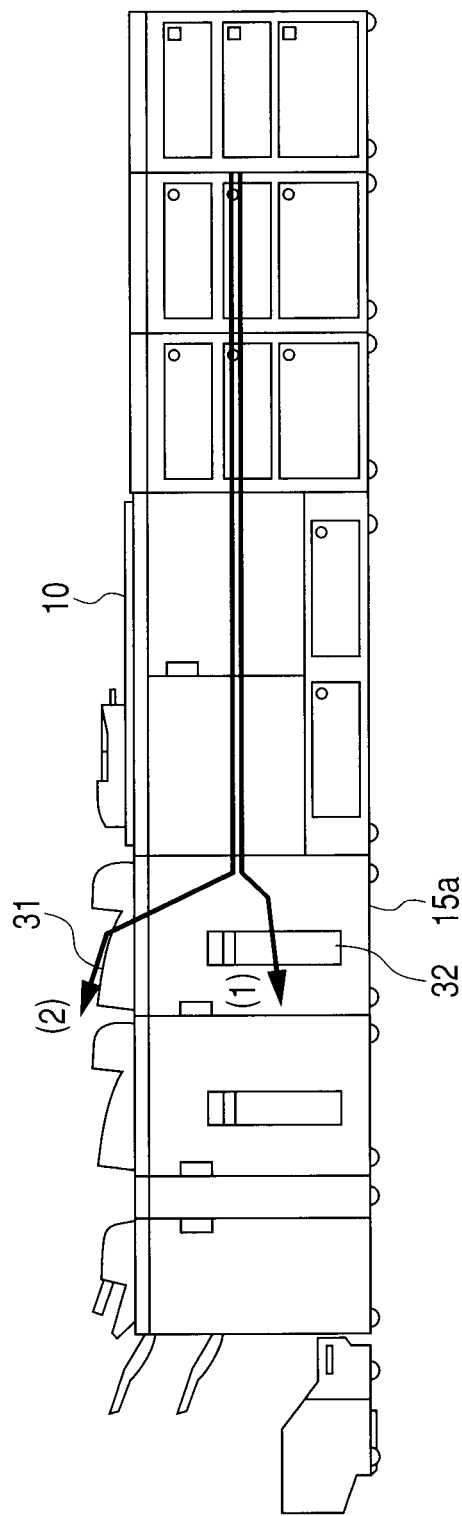
FIG. 15 is a diagram illustrating a sheet conveyance path for a job.

Here, outputting to the Stacker-A means outputting to the stack tray 32 (on the right side) in the stacker A which is placed by the image forming apparatus 10 among the two stackers shown in FIG. 15. The sheet conveyance path indicated by an arrow (1) is taken in FIG. 15. Similarly, the sixth page which is the confirmation page is also output to the sample tray 31 in the stacker A which is placed by the image forming apparatus 10. At this time, the sheet conveyance path indicated by an arrow (2) is taken in FIG. 15. The seventh through fifteenth pages are output to the stack tray 32 in the stacker A again. At this time, the sheet conveyance path indicated by the arrow (1) is taken again. The JDF description for switching the output destination is described by DigitalPrintingParams shown in FIG. 14.

Figure 17:
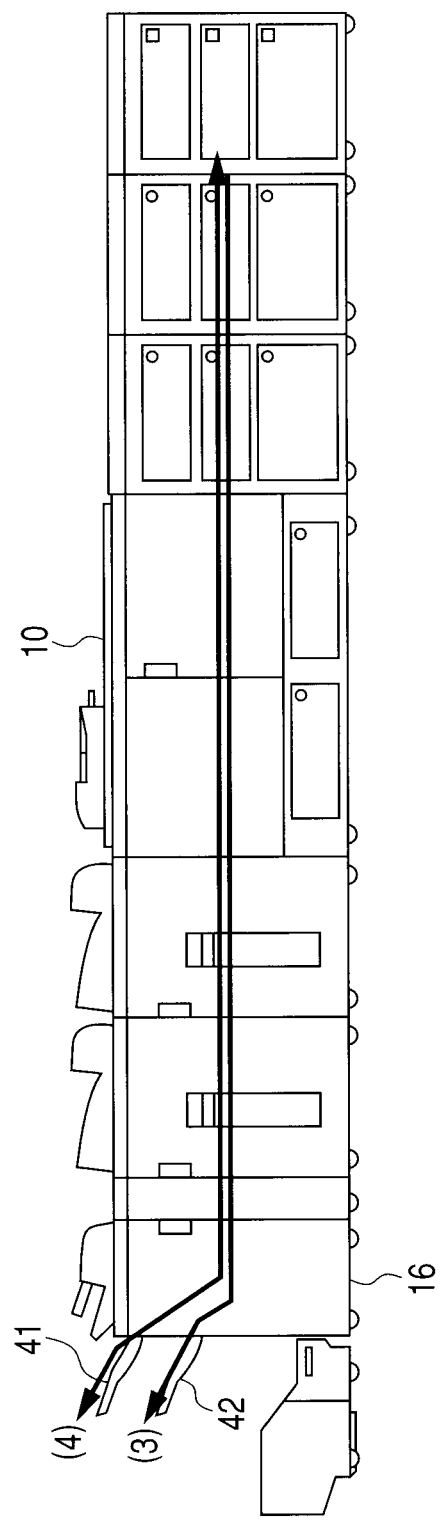
FIG. 17 is a diagram illustrating a sheet conveyance path for a job including post-processing.

In the similar manner, FIG. 16 and FIG. 17 show an example of a case where the pages for main printing are output to a tray B42 of the saddle-stitch binding apparatus (finisher) 16 and the confirmation page is output to a tray A41 for the job of JDF ID=J2, JobPartID=ID1. That shows a system of outputting the first through fifth pages and the seventh through fifteenth pages of the pages for main printing to the tray B42 of the saddle-stitch binding apparatus (finisher) 16. At this time, the sheet conveyance path indicated by an arrow (3) is taken. That also shows a system of outputting only the sixth page which is the confirmation page to the tray A41 of the saddle-stitch binding apparatus (finisher) 16. At this time, the sheet conveyance path indicated by an arrow (4) is taken. Further, as for the job to be output to the tray B42, the settings are such that the overall job is stapled. The JDF description for switching the output destination is described by DigitalPrintingParams shown in FIG. 16, and the JDF description for designating the stapling is described by StintchingParams shown in FIG. 16.

As described above, the settings of the confirmation printing can be provided for the job by describing the JDF included in the job to be output to the output destination different from that of the pages for main printing. With such a method, the image forming apparatus 10 that prints the job can implement the function of the confirmation printing if only the image forming apparatus 10 can interpret the JDF. This is not limited to the case where the job ticket is the JDF. The same advantage can be obtained by describing the confirmation page to be output to the output destination different from that of the page for main printing even when the job setting method other than the JDF is taken.

Figure 18:
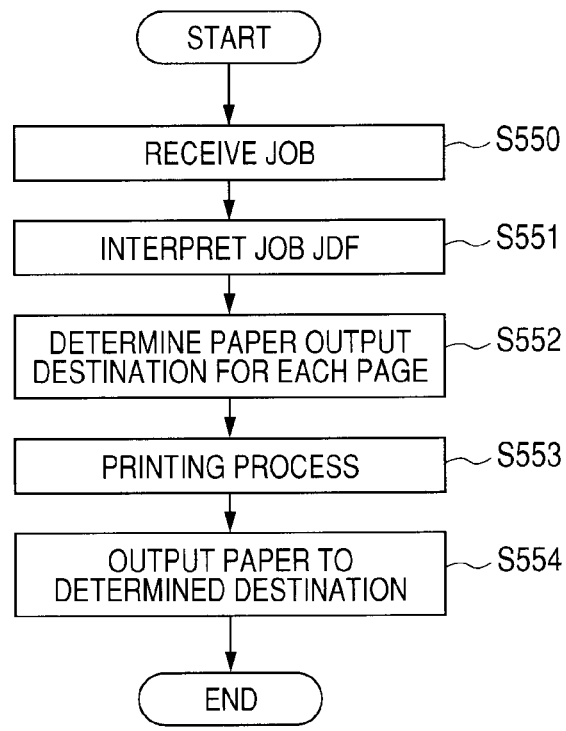
FIG. 18 is a flowchart for the image forming apparatus to output a page for main printing and a confirmation page.

Now, FIG. 18 shows an example of a flowchart for the image forming apparatus 10 to allocate the page for main printing and the confirmation page to respective trays by using the JDF included in the job the image forming apparatus 10 has received.

In step S550, the external I/F unit 51 receives a job sent from the client PC 12.

In step S551, the JDF interpreting unit 52 interprets the content of the JDF included in the job received.

In step S552, the job controlling unit 54 determines the output destination of the printed material for each page based on the content of the JDF interpreted. Here, it is determined that the pages for main printing and the confirmation page are output to different output destinations according to the content of the JDF.

In step S553, the printer unit executes printing.

In step S554, the printed material is output to the output destination determined by the job controlling unit 54.

Even the image forming apparatus 10 without the function of confirmation printing can implement a function similar to confirmation printing by interpreting the JDF included in the job and allocating the pages for main printing and the confirmation page to the different output destinations.

Although it is described that the confirmation printing is executed for each page in the embodiment, it may be configured to execute the confirmation printing for each copy. Here, the case where the image forming apparatus 10 cannot switch the output destination of each page (or for each copy) in the same job will be considered. In that case, it can be configured to determine the different output destinations of the printed material of the pages for main printing and the confirmation page in step S552 by executing a shift operation at one of the output destinations.

Second Embodiment

Figure 19:
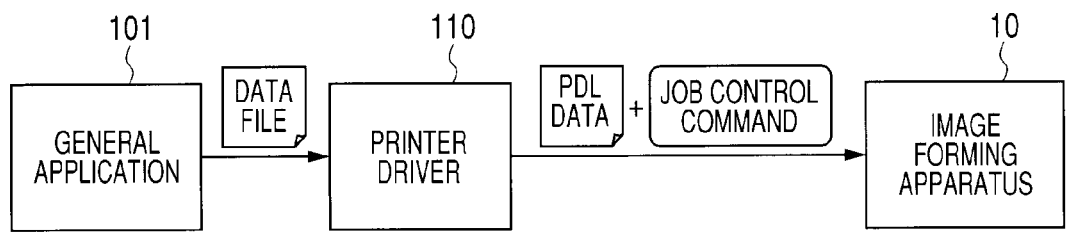
FIG. 19 is a diagram illustrating an example of sending a job in a second embodiment.

The confirmation printing is set in the document processing system 20 in the first embodiment. In the second embodiment, the case where the confirmation printing is set by using a printer driver 110 of the image forming apparatus 10 corresponding to the general application 101 when the data file generated by the general application 101 is to be printed will be described as shown in FIG. 19. Since it is assumed that the general application 101 and the printer driver 110 corresponding to the general application 101 have been installed in the client PC 12, description of the same configuration as that of the first embodiment will be omitted and only the difference from the first embodiment will be described.

Figure 20:
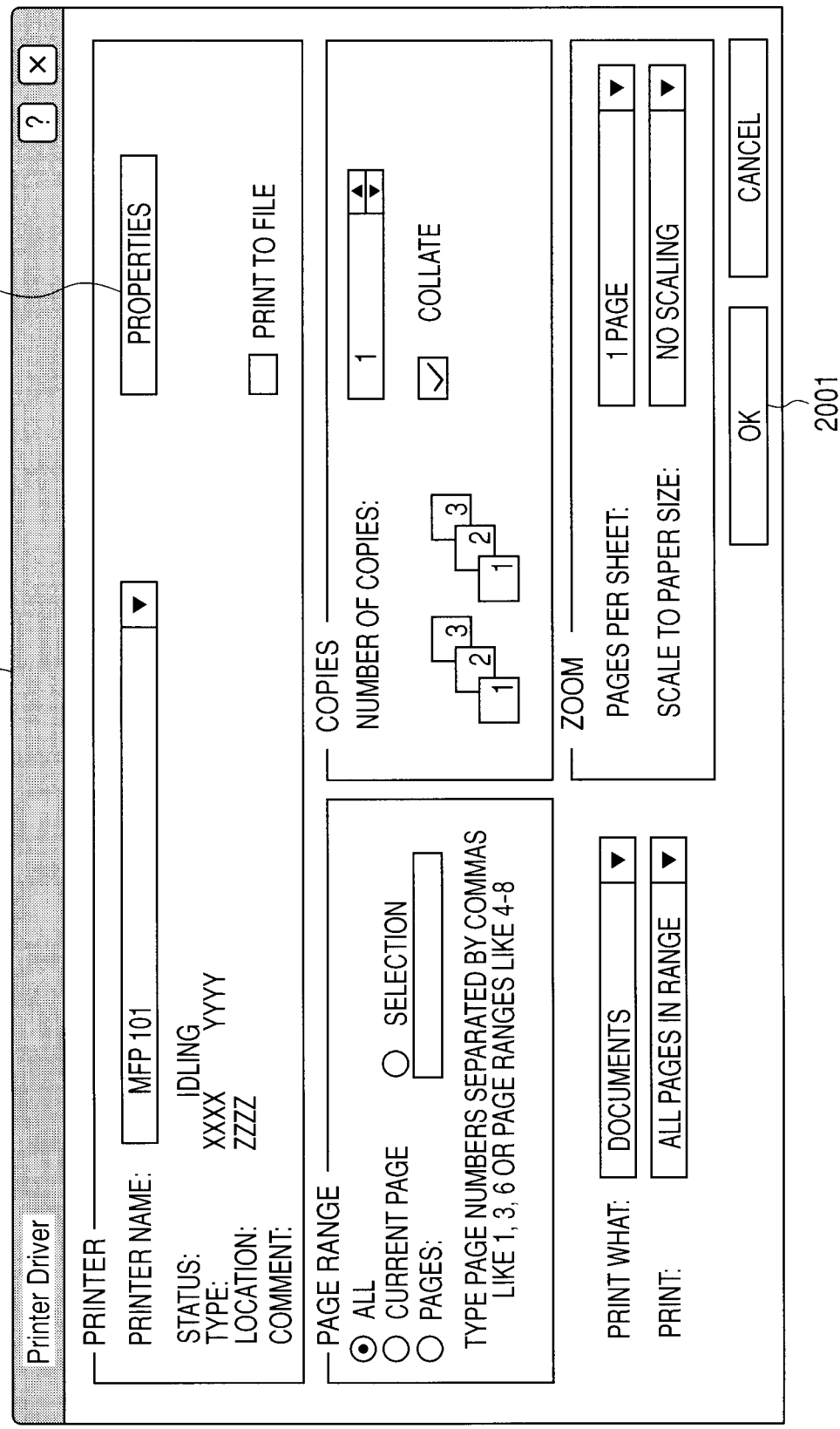
FIG. 20 is a diagram illustrating an example of a UI of a printer driver.

When a print instruction is issued in the general application 101, a screen 2000 of the printer driver 106 as shown in FIG. 20 is displayed on the CRT 210 under the control of the CPU 201. In response to an operation by the user on the screen 2000, the CPU 201 executes the print setting. When the user clicks on an OK button 2001, the printer driver 106 creates PDL data from a data file which has been generated by the general application 101. At the same time, the printer driver 106 issues the job control command based on the above-described settings. The PDL data and the job control command are sent to the image forming apparatus 10. The image forming apparatus 10, in turn, prints the job and outputs it as the printed materials.

Figure 21:
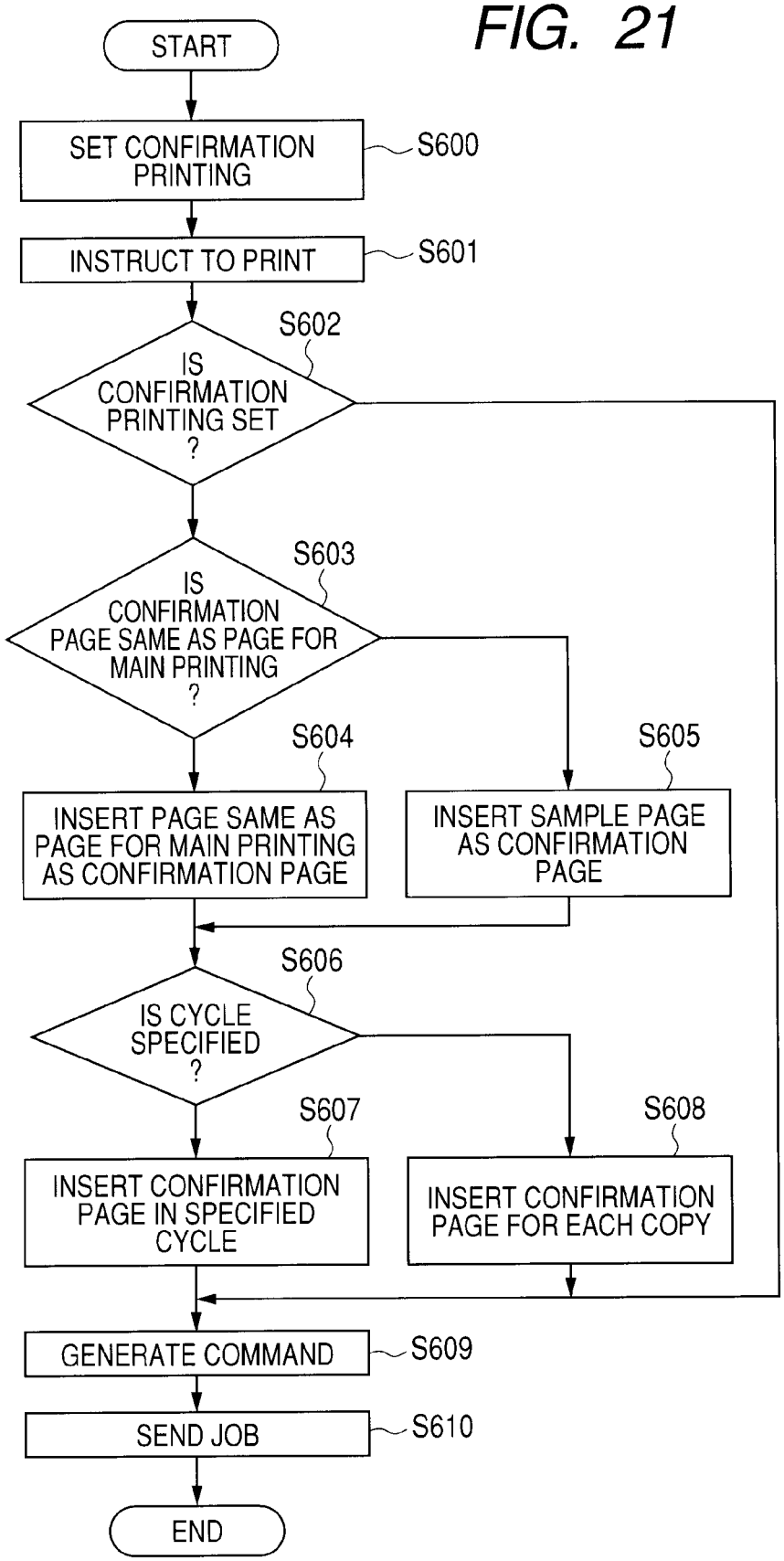
FIG. 21 is a flowchart for setting confirmation printing in the second embodiment.

Now, the process in the case where the confirmation printing setting is executed by the above-described printer driver 110 will be described with reference to the flowchart shown in FIG. 21. The process flow shown by the flowchart of FIG. 21 is implemented by the CPU 201 executing the program in the ROM 203 or the HD 211.

Figure 22:
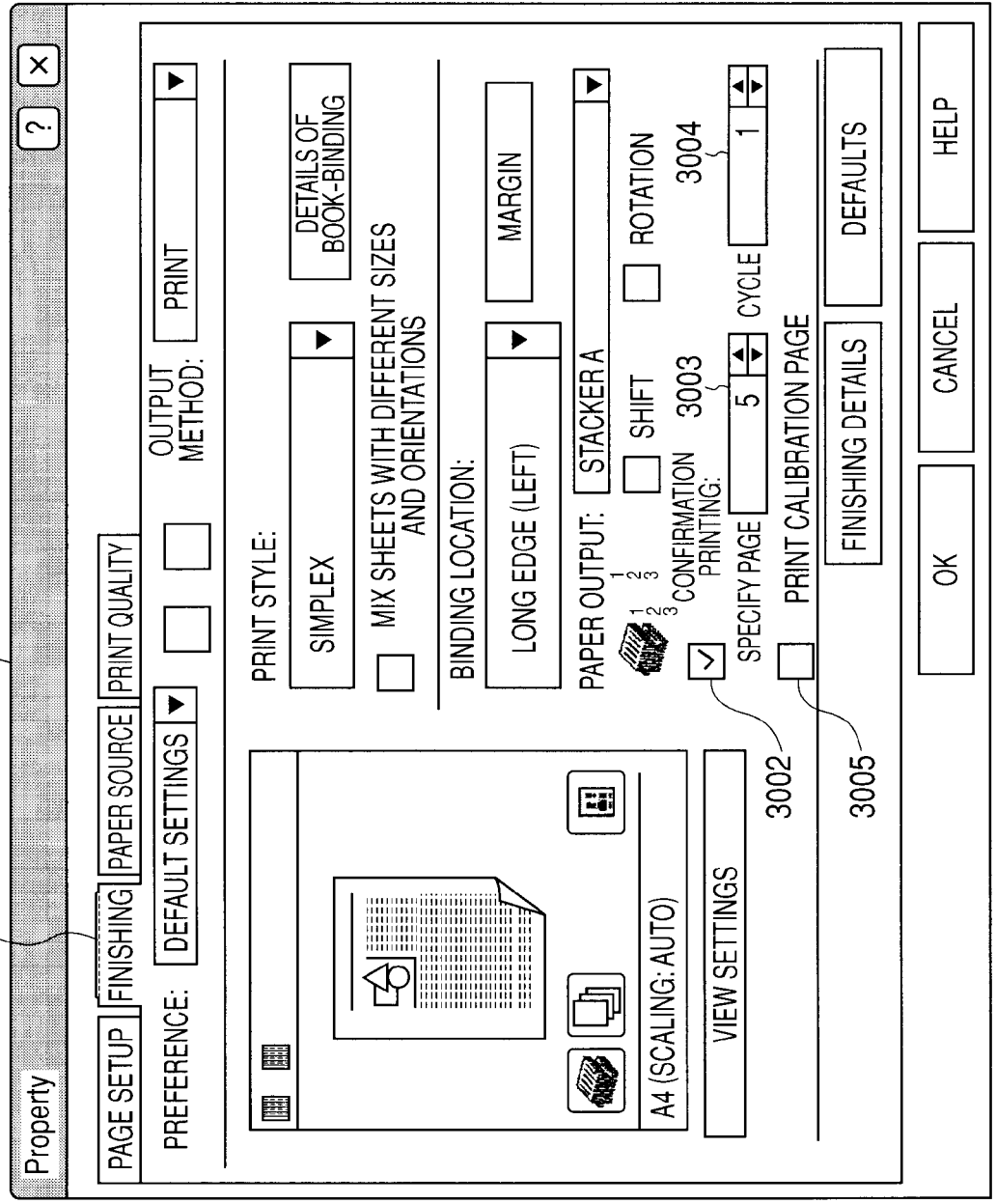
FIG. 22 is a diagram illustrating an example of a screen for setting confirmation printing in the printer driver.

In step S600, the confirmation printing setting is executed according to operations by the user with the keyboard 209, the pointing device and the like on the screen 2000 of the printer driver 110. Here, examples of the setting method are shown with reference to FIG. 20 and FIG. 22. When the CPU 201 recognizes that the user clicked on a property button 2002 on the screen 2000, the CPU 201 controls the CRT 210 to display a property screen 3000 shown in FIG. 22. Here, the property screen 3000 is a screen displayed in response to clicking on a finishing tab 3001. When the user clicks on the check box 3002 for the confirmation printing, a field 3003 for SPECIFY PAGE, CYCLE field 3004, and a check box 3005 for PRINT CALIBRATION PAGE become active. The field 3003 for SPECIFY PAGE is for specifying the page to be used as the confirmation page among the pages for main printing of the job. When a value is input to the SPECIFY PAGE field, the confirmation printing setting is executed such that the CPU 201 outputs the page same as the page for main printing of the job corresponding to the input specified page, as the confirmation page in case of confirmation printing. The CYCLE field 3004 indicates the cycle of executing the confirmation printing in the printing process. The confirmation printing setting is executed so that the confirmation page is output on a cycle input in the CYCLE field 3004. In response to clicking on the check box 3005 for PRINT CALIBRATION PAGE, a prepared calibration page other than the page for main printing is set as the confirmation page to be output in the confirmation printing. Although the case where the calibration page other than the page for main printing is prepared is described here, it may also be configured to have the CPU 201 set a specified page as the confirmation page in response to the user clicking on an arbitrary page other than the page for main printing.

The confirmation page is set to be output to the output destination different from that of the page for main printing when the confirmation page is output as the printed material in the image forming apparatus 10. It may also be configured to have the output destination of the page for main printing or the confirmation page set in response to the user specifying both or either of the output destinations of the page for main printing and the confirmation page.

In step S601, the CPU 201 recognizes that the user clicked on the OK button 2001 and issued the print instruction.

Since the processes in step S602 to step S608 are the same as those in step S502 to step S508 except that the document processing system 20 is replaced by the printer driver 110, description of the process will be omitted.

In step S609, PDL data and a job control command are generated based on the settings of the confirmation printing.

In step S610, the generated PDL data and job control command are sent to the image forming apparatus 10 as a job.

Even the image forming apparatus 10 without the function of the confirmation printing can implement the function of the confirmation printing by having the job sent by the above-described process received and printed by the image forming apparatus 10.

Although the case where the settings of the confirmation printing are specified in the job control command is described in the embodiment, the settings information of the confirmation printing may be included in the PDL data.

Now, details of the arbitrary page other than the page for main printing which is used as the confirmation page will be described.

Figure 23:
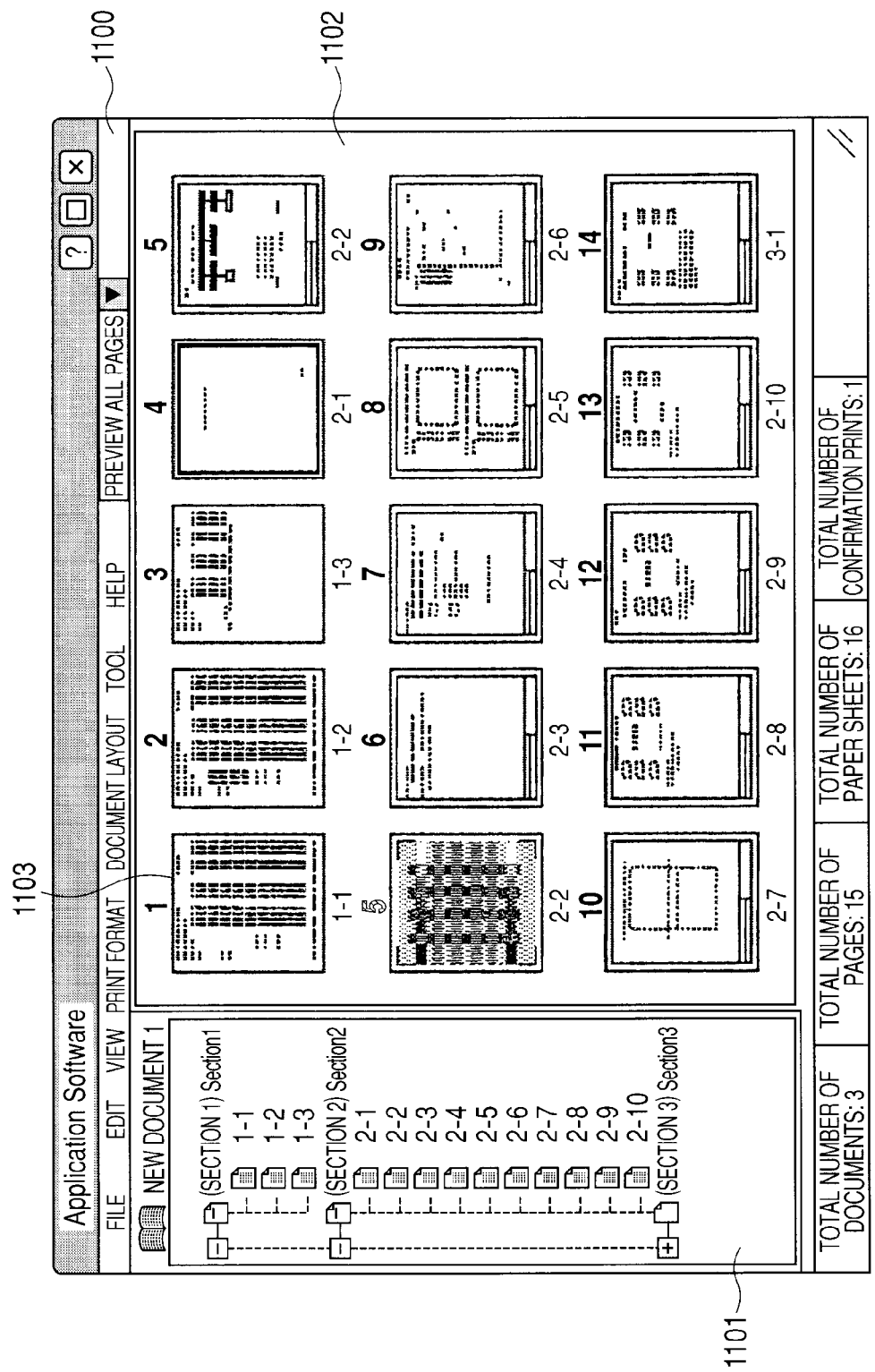
FIG. 23 is a diagram illustrating an example of a preview screen in which a page other than that of main printing is a confirmation page.
Figure 24:
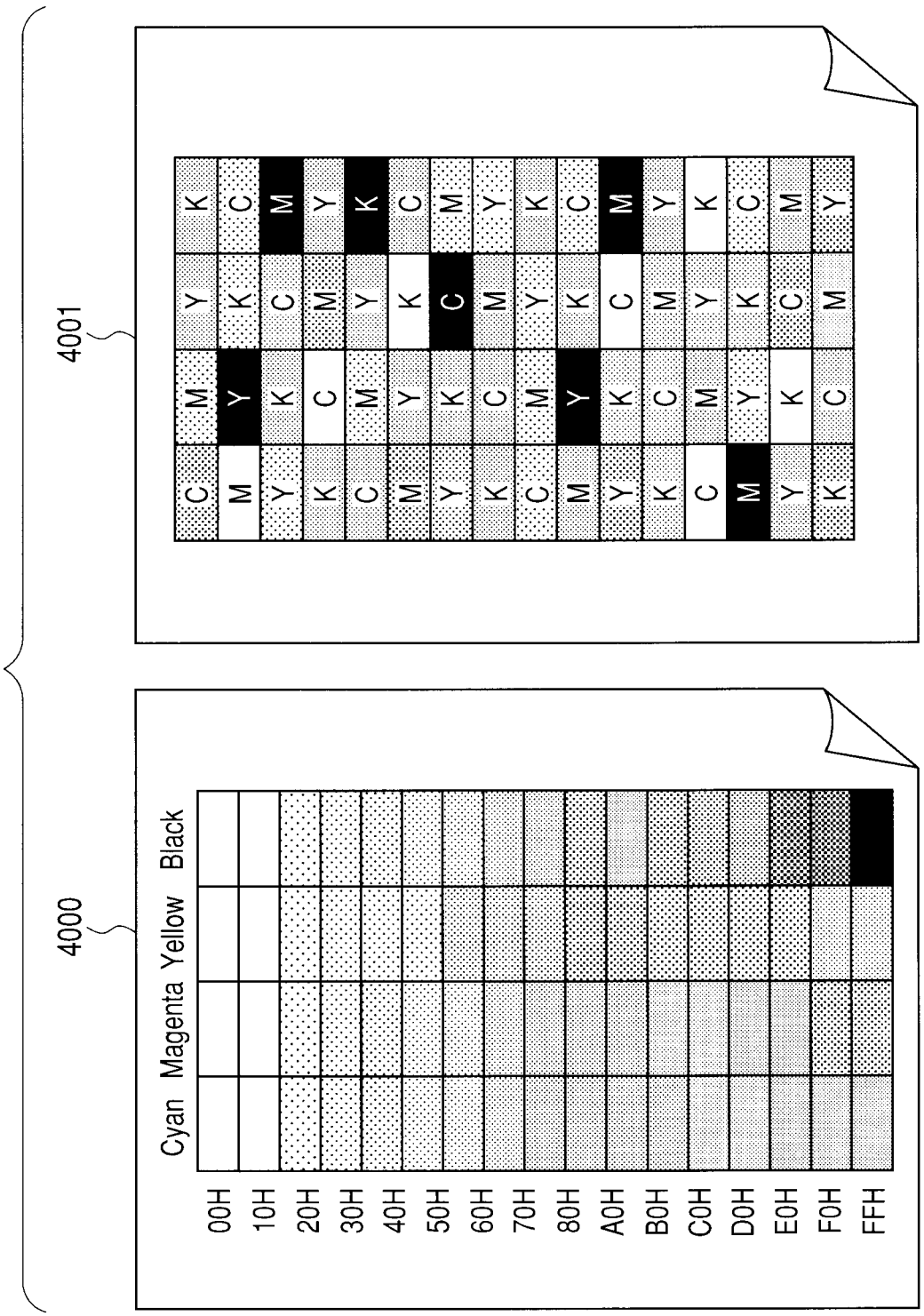
FIG. 24 is a diagram illustrating an example of a confirmation page other than the page for main printing.

As described above, it may be configured not only to have the confirmation page for the confirmation printing selected from the page for main printing but also to have it selected from arbitrary sample pages such as those for calibration. This is because that the users are concerned about color fluctuation or a shift of geometric characteristic such as registration in the most cases. Therefore, as shown in FIG. 23, a predetermined sample page for calibration or the like is inserted in the place where the fifth page was displayed twice in the above description in order to provide the sixth page as the confirmation printing.

In addition, a color density patch 4000 or a chart 4001 for checking color irregularity for print positions may be inserted. The page inserted here is reflected on the PDL data and sent to the image forming apparatus 10.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. To the contrary, the invention is intended to cover various modifications and equivalent arrangements included within the spirit and scope of the appended claims.

This application claims the benefit of Japanese Patent Application No. 2008-231195, filed Sep. 9, 2008, which is hereby incorporated by reference herein in its entirety.

The invention claimed is:

1. An information processing apparatus connected with an image forming apparatus and capable of creating a job which can be processed by an the image forming apparatus, wherein the image forming apparatus prints and outputs a page for main printing included in a job received from the information processing apparatus according the job, the information processing apparatus comprising:
- a receiving unit constructed to receive an instruction for setting confirmation printing in which a confirmation page is printed in addition to the page for main printing and output to a destination different from that of the page for main printing;
- a setting unit constructed to provide settings for the confirmation printing according to the instruction received by the receiving unit;
- a sending unit constructed to send the job with the settings for the confirmation printing provided by the setting unit to the image forming apparatus; and
- a previewing unit constructed to provide a print preview that shows the page for main printing without the confirmation page when a first display method is selected, and a print preview that shows both of the page for main printing and the confirmation page when a second display method is selected.

2. The information processing apparatus according to claim 1, wherein the receiving unit is constructed to receive an instruction for setting a cycle of outputting the confirmation printing according to an operation by the user.

3. The information processing apparatus according to claim 1, wherein the receiving unit is constructed to receive an instruction for setting a page same as an arbitrary page in the page for main printing as the confirmation page.

4. The information processing apparatus according to claim 1, wherein the receiving unit is constructed to receive an instruction for setting an arbitrary page other than the page for main printing as the confirmation page.

5. The information processing apparatus according to claim 4, wherein the arbitrary page other than the page for main printing is a predetermined sample page used for calibration.

6. The information processing apparatus according to claim 1, wherein the receiving unit is constructed to receive an instruction for setting at least either a destination for the page for main printing or a destination for the confirmation page according to the operation by the user.

7. The information processing apparatus according to claim 1, wherein the setting unit provides the settings for the confirmation printing for the job by describing a job ticket included in the job so as to output the confirmation page to a destination different from that of the page for main printing.

8. A control method for an information processing apparatus connected with an image forming apparatus and capable of creating a job which can be processed by an the image forming apparatus, wherein the image forming apparatus prints and outputs a page for main printing included in a job received from the information processing apparatus according the job, said method comprising:
- receiving an instruction for setting confirmation printing in which a confirmation page is printed in addition to the page for main printing and output to a destination different from that of the page for main printing;
- providing settings for the confirmation printing according to the received instruction;
- sending the job with the provided settings for the confirmation printing to the image forming apparatus; and
- providing a print preview that shows the page for main printing without the confirmation page when a first display method is selected, and a print preview that shows both of the page for main printing and the confirmation page when a second display method is selected.

9. The control method according to claim 8, wherein, in the receiving, an instruction for setting a cycle of outputting the confirmation printing can be received according to an operation by the user.

10. The control method according to claim 8, wherein, in the receiving, an instruction for setting an arbitrary page other than the page for main printing can be received as the confirmation page.

11. A non-transitory computer readable storage medium that stores a program for causing a computer to execute the method according to claim 8.

* * * * *